(12) United States Patent
Furuya et al.

(10) Patent No.: US 10,803,801 B2
(45) Date of Patent: Oct. 13, 2020

(54) IMAGE DISPLAY DEVICE

(71) Applicant: Panasonic Intellectual Property Management Co., Ltd., Osaka (JP)

(72) Inventors: Hiroyuki Furuya, Osaka (JP); Susumu Uragami, Osaka (JP); Yuta Yamamoto, Kyoto (JP); Akira Kurozuka, Osaka (JP); Mitsutaka Yamaguchi, Gifu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 67 days.

(21) Appl. No.: 16/242,594

(22) Filed: Jan. 8, 2019

(65) Prior Publication Data

US 2019/0228705 A1    Jul. 25, 2019

(30) Foreign Application Priority Data

Jan. 23, 2018  (JP) ................................. 2018-009105
Feb. 2, 2018   (JP) ................................. 2018-017516

(51) Int. Cl.
  *G09G 3/36*       (2006.01)
  *G09G 3/3233*     (2016.01)
  *G02B 27/01*      (2006.01)
  *G02B 5/08*       (2006.01)
  *G03B 21/20*      (2006.01)
  (Continued)

(52) U.S. Cl.
  CPC ............. *G09G 3/3233* (2013.01); *G02B 5/08* (2013.01); *G02B 26/12* (2013.01); *G02B 27/0101* (2013.01); *G03B 21/2033* (2013.01); *G09G 3/025* (2013.01); *G09G 2320/041* (2013.01);
  (Continued)

(58) Field of Classification Search
  CPC .. G09G 3/36; G09G 5/00; G09G 5/10; G09G 3/34; G06F 3/038
  See application file for complete search history.

(56) References Cited

U.S. PATENT DOCUMENTS

2015/0092118 A1* 4/2015 Hada ....................... G02B 27/01
                                                        349/11
2017/0280117 A1* 9/2017 Ogi ....................... H04N 9/3155
(Continued)

FOREIGN PATENT DOCUMENTS

JP     2017-049569 A     3/2017
JP     2017-173716 A     9/2017

*Primary Examiner* — Pegeman Karimi
(74) *Attorney, Agent, or Firm* — McDermott Will & Emery LLP

(57) ABSTRACT

An image display device includes: a light source emitting laser light; a screen on which an image is drawn by being two-dimensionally scanned by the laser light; a scanner causing the laser light to scan the screen; a light detector detecting a light amount of the laser light emitted from the light source; and a controller controlling the light source by changing a current value to drive the light source in response to a target light amount. The controller obtains a detection signal when driving the light source at a plurality of current setting values from the light detector, and corrects the current value with respect to the target light amount according to an arithmetic operation configured to suppress a difference between an output characteristic of the light source guessed by the obtained detection signal and a reference output characteristic.

13 Claims, 15 Drawing Sheets

(51) Int. Cl.
   *G02B 26/12* (2006.01)
   *G09G 3/02* (2006.01)
(52) U.S. Cl.
   CPC ... *G09G 2320/062* (2013.01); *G09G 2380/10* (2013.01)

(56) References Cited

U.S. PATENT DOCUMENTS

| | | |
|---|---|---|
| 2018/0137797 A1 | 5/2018 | Ohara |
| 2018/0246324 A1* | 8/2018 | Hada ...................... G02B 26/08 |

* cited by examiner

FIG.5

| LUMINANCE LEVEL | TEMPERATURE (°C) | THRESHOLD CURRENT VALUE | SCALE VALUE |
|---|---|---|---|
| 1 | 5 | Ith11 | Isc11 |
| | 15 | Ith12 | Isc12 |
| | ⋮ | ⋮ | ⋮ |
| | 75 | Ith18 | Isc18 |
| 2 | 5 | Ith21 | Isc21 |
| | 15 | Ith22 | Isc22 |
| | ⋮ | ⋮ | ⋮ |
| | 75 | Ith28 | Isc28 |
| ⋮ | ⋮ | ⋮ | ⋮ |

| LUMINANCE LEVEL | TEMPERATURE (°C) | HIGH OUTPUT SIDE SETTING VALUE | | LOW OUTPUT SIDE SETTING VALUE | |
|---|---|---|---|---|---|
| | | CURRENT VALUE | LIGHT OUTPUT | CURRENT VALUE | LIGHT OUTPUT |
| 1 | 5 | IH11 | PH11 | IL11 | PL11 |
| | 15 | IH12 | PH12 | IL12 | PL12 |
| | ⋮ | ⋮ | ⋮ | ⋮ | ⋮ |
| | 75 | IH18 | PH18 | IL18 | PL18 |
| 2 | 5 | IH21 | PH21 | IL21 | PL21 |
| | 15 | IH22 | PH22 | IL22 | PL22 |
| | ⋮ | ⋮ | ⋮ | ⋮ | ⋮ |
| | 75 | IH28 | PH12 | IL28 | PL28 |
| ⋮ | ⋮ | ⋮ | ⋮ | ⋮ | ⋮ |

OPTICAL WAVEFORM IN
ENVIRONMENT OF 25 °C

OPTICAL WAVEFORM IN
ENVIRONMENT OF -20 °C

IMAGE DISPLAY DEVICE

CROSS REFERENCE TO RELATED APPLICATION

This application claims priority under 35 U.S.C. Section 119 of Japanese Patent Applications No. 2018-009105 filed Jan. 23, 2018, entitled "IMAGE DISPLAY DEVICE" and Japanese Patent Applications No. 2018-0017516 filed Feb. 2, 2018, entitled "IMAGE DISPLAY DEVICE". The disclosures of these above applications are incorporated herein by reference.

BACKGROUND OF THE INVENTION

1. Technical Field

The present invention relates to an image display device which displays an image, and for example, is suitable for being mounted on a moving body such as a vehicle.

2. Description of the Related Art

In recent years, an image display device called a head-up display has been developed, and has been mounted on a moving body such as a vehicle. In a head-up display mounted on a vehicle, light modulated by image information is projected toward a windshield (windscreen), and the light reflected by the windshield is irradiated to driver's eyes. Thereby, the driver can see a virtual image of an image in front of the windshield. For example, drive assistant information such as a vehicle speed, various warning markers, or an arrow showing a traveling direction of a vehicle is displayed as the virtual image.

In the head-up display, a laser light source can be used as a light source. In this case, the laser light scans a screen while being modulated in response to a video signal. Thereafter, the laser light is diffused by the screen, and is guided to an eye box near the driver's eyes. Thereby, the driver can see the image (virtual image) satisfactorily and stably even if the driver moves the head to some extent. The eye box has, for example, an oblong rectangular shape.

Here, in the laser light source, a current value of a drive current is adjusted so that a target light amount in response to luminance can be obtained.

The following configuration is described in Japanese Unexamined Patent Application Publication No. 2017-173716. A laser light source is caused to emit light in a fly-back period in a frame to adjust a current value of the laser light source. In the configuration, light emission is performed at three current values in the fly-back period in each of successive three frames. That is, light emission is performed at a set of points A, B, and C in a fly-back period in a frame 1; the light emission is performed at a set of points B, C, and D in a fly-back period in a frame 2; and the light emission is performed at a set of points C, D, and E in a fly-back period in a frame 3. In each of the light emissions, a light amount is detected. The three light amounts detected in each of the frames are compared with a target value, and a current value which is closest to the target value is obtained. The current value thus obtained is substituted with the current value of the next frame.

The following configuration is described in Japanese Unexamined Patent Application Publication No. 2017-49569. In a range in which a scanning mirror scans, laser light for adjusting an output value is output outside a range in which a display image is drawn, and the output value of a laser light source is adjusted based on the detection value of the laser light.

The configuration described in Japanese Unexamined Patent Application Publication No. 2017-173716 makes it necessary to cause the laser light source to emit light at three different current values for the three frames. This causes a problem that it takes time to adjust the current value corresponding to the target light amount.

An image display device normally performs processing for correcting the distortion of a display image. For example, when an image display device is used for on-vehicle use, the display image is distorted from a predetermined shape by the curved surface shape of a windshield, or the like. An image drawing region on a screen is corrected so that the distortion is corrected. For this reason, the shape of the image drawing region on the screen changes for every curved surface shape of the windshield. For this reason, as described in Japanese Unexamined Patent Application Publication No. 2017-49569, the configuration in which the laser light for adjusting an output value is output outside the range in which the display image is drawn makes it difficult to preliminarily set the emission position of the laser light for adjusting an output value, which makes it necessary to adjust the emission position of the laser light for adjusting an output value for every curved surface shape of the windshield.

One object of the present invention is to effectively shorten the correction processing of a current value corresponding to a target light amount. Another object of the present invention is to smoothly adjust the output of a laser light source irrespective of the distortion correction of a display image.

SUMMARY OF THE INVENTION

An image display device according to a first aspect of the present invention includes: a light source emitting laser light; a scanner causing the laser light to scan to draw an image; a light detector detecting a light amount of the laser light emitted from the light source; and a controller controlling the light source by changing a current value configured to drive the light source in response to a target light amount. Here, the controller obtains a detection signal when driving the light source at a plurality of current setting values from the light detector, and corrects the current value with respect to the target light amount according to an arithmetic operation configured to suppress a difference between an output characteristic of the light source guessed by the obtained detection signal and a reference output characteristic.

According to the image display device according to the first aspect, the light source may be caused to emit light by the number of times allowing the output characteristic of the light source to be guessed, whereby the number of light emissions of the light source required for correcting the current value can be remarkably reduced. Therefore, the correction processing of the current value corresponding to the target light amount can be effectively shortened.

An image display device according to a second aspect of the present invention includes: a light source emitting laser light; a screen on which an image is drawn by being two-dimensionally scanned by the laser light; a scanner causing the laser light to scan the screen; a light detector detecting a light amount of the laser light emitted from the light source; and a controller. Here, the controller causes the light source to emit the laser light for adjusting an output value of the light source at a predetermined position in a range of a display angle configured to display a display image of one frame, and adjusts an output of the light source based on a detection signal of the light detector with respect to the laser light for adjusting the output value.

According to the image display device according to the second aspect, the laser light for adjusting the output value is emitted at the predetermined position in the range of the display angle configured to display the display image of one frame, which makes it unnecessary to adjust the emission position of the laser light for adjusting the output value even when the image drawing region on the screen changes for the distortion correction of the display image. Therefore, the output of the laser light source can be smoothly adjusted irrespective of the distortion correction of the display image.

BRIEF DESCRIPTION OF THE DRAWINGS

The above and other objects and novel characteristics of the present invention will be more fully understood with reference to the following description of embodiments and the accompanying drawings.

FIG. 5 is a diagram illustrating the configuration of a look-up table for setting a threshold current value and a scale value according to the embodiment 1;

The drawings are exclusively illustrative, and does not limit the scope of the present invention.

DESCRIPTION OF PREFERRED EMBODIMENTS

Hereinafter, embodiments of the present invention will be described with reference to the accompanying drawings. For convenience, X, Y, and Z-axes perpendicular to one another are added to respective drawings as appropriate.

Embodiment 1

Figure 1A:
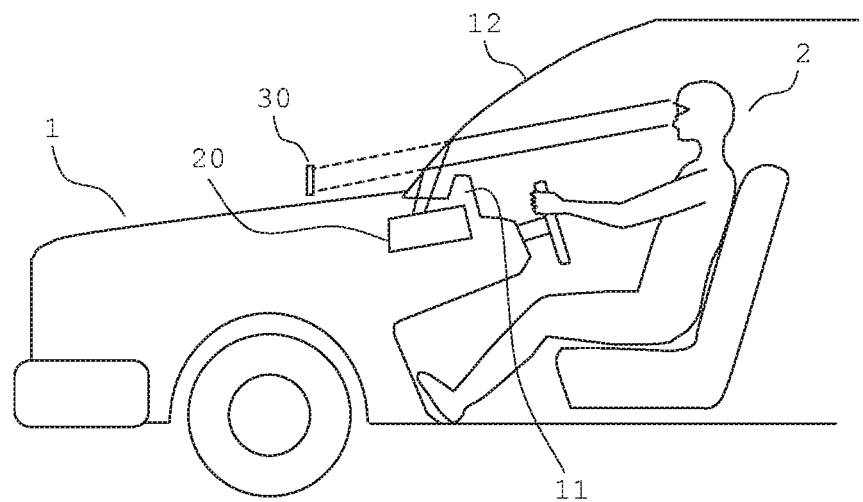
FIG. 1A is a diagram schematically illustrating the usage form of an image display device according to an embodiment 1.
Figure 1B:
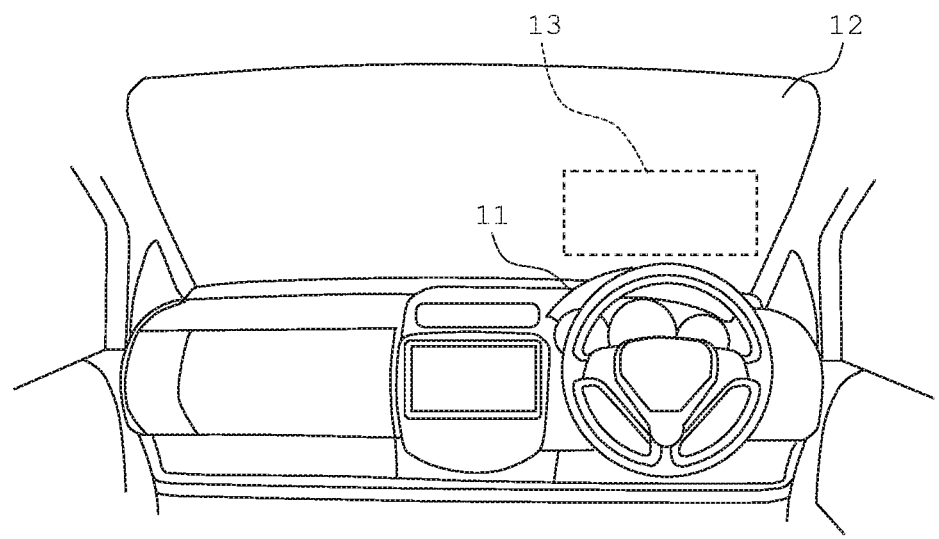
FIG. 1B is a diagram schematically illustrating the usage form of an image display device according to the embodiment 1.

FIGS. 1A and 1B are diagrams each schematically illustrating the usage form of an image display device 20. FIG. 1A is a diagram schematically illustrating, in a see-through manner, the inner portion of a vehicle 1 as viewed from the side of the vehicle 1, and FIG. 1B is a diagram illustrating the front of the vehicle 1 in a driving direction as viewed from the inner portion of the vehicle 1.

The present embodiment is a head-up display for on-vehicle use to which the present invention is applied. As shown in FIG. 1A, the image display device 20 is placed inside a dashboard 11 of the vehicle 1.

As shown in FIG. 1A and FIG. 1B, the image display device 20 projects light modulated by a video signal onto a projection region 13 near a driver's seat on the lower side of a windshield 12. The projected light is reflected by the projection region 13, and is irradiated to an oblong region (eye box region) around the position of driver 2's eyes. Thereby, a predetermined image 30 is displayed as a virtual image in a viewing field in front of the driver 2. The driver 2 can see an image 30 which is a virtual image, in an overlapping manner on a scene in front of the windshield 12. That is, the image display device 20 forms the image 30 which is a virtual image, in a space in front of the projection region 13 of the windshield 12.

Figure 1C:
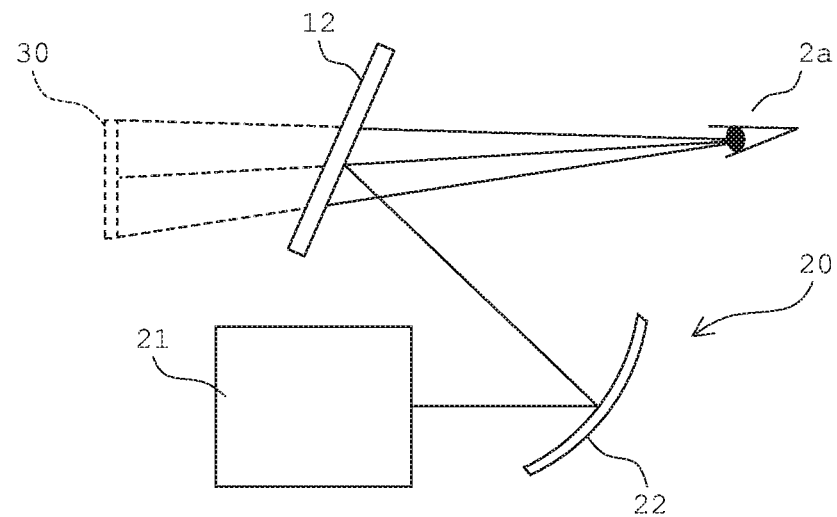
FIG. 1C is a diagram schematically illustrating the configuration of an image display device according to the embodiment 1.

FIG. 1C is a diagram schematically illustrating the configuration of the image display device 20.

The image display device 20 includes an irradiation light generator 21 and a mirror 22. The irradiation light generator 21 emits light modulated by the video signal. The mirror 22 has a curved reflecting surface, and reflects the light emitted from the irradiation light generator 21, toward the windshield 12. The light reflected by the windshield 12 is irradiated to an eye 2a of the driver 2. An optical system of the irradiation light generator 21 and the mirror 22 are designed so that the image 30 as a virtual image can be displayed in a predetermined size in front of the windshield 12.

The mirror 22 configures an optical system for producing a virtual image from light generated from screens 110, 111 to be described later. The optical system may not necessarily include only the mirror 22. For example, the optical system may include a plurality of mirrors, or a lens.

Figure 2:
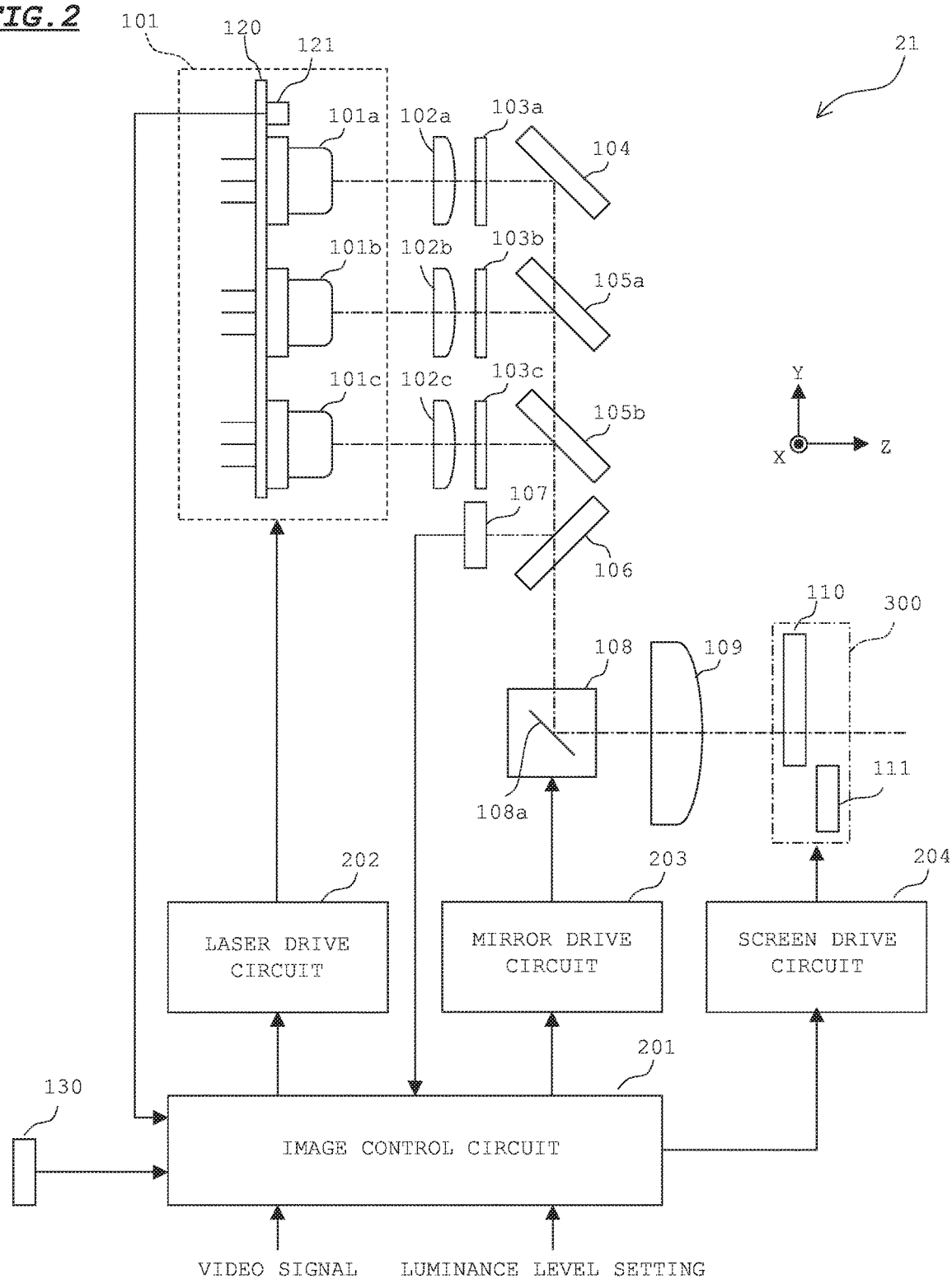
FIG. 2 is a diagram illustrating the configuration of an irradiation light generator of the image display device according to the embodiment 1 and the configuration of a circuit used for the irradiation light generator.

FIG. 2 is a diagram illustrating the configuration of the irradiation light generator 21 of the image display device 20 and the configuration of a circuit used in the irradiation light generator 21.

The irradiation light generator 21 includes a light source 101, collimator lenses 102a to 102c, apertures 103a to 103c, a mirror 104, dichroic mirrors 105a, 105b, a sampling mirror 106, a light detector 107, a scanner 108, a correction lens 109, and screens 110, 111.

The light source 101 includes three laser light sources 101a, 101b, and 101c.

The laser light source 101a emits red wavelength laser light included in a range of 635 nm or more and 645 nm or less. The laser light source 101b emits green wavelength laser light included in a range of 510 nm or more and 530 nm or less. The laser light source 101c emits blue wavelength laser light included in a range of 440 nm or more and 460 nm or less.

In the present embodiment, in order to display a color image as the image 30, the light source 101 includes the three laser light sources 101a, 101b, and 101c. The laser light sources 101a, 101b, and 101c include a semiconductor laser, for example. When a monochromatic image is displayed as the image 30, the light source 101 may include only one laser light source corresponding to the color of the image. The light source 101 may have a configuration including two laser light sources having different emission wavelengths.

The laser light emitted from each of the laser light sources 101a, 101b, and 101c is converted into parallel light by each of the collimator lenses 102a to 102c. The laser light transmitted through each of the collimator lenses 102a to 102c is shaped into a circular beam shape having substantially the same size by each of the apertures 103a to 103c.

That is, the apertures 103a to 103c configure a beam shaper for aligning the beam sizes and beam shapes of the laser lights emitted from the laser light sources 101a, 101b, and 101c with one another.

In place of the collimator lenses 102a to 102c, shaping lenses may be used, which shape the laser light into a circular beam shape and collimate the laser light. In this case, the apertures 103a to 103c can be omitted.

Thereafter, with regard to the laser light of each color emitted from each of the laser light sources 101a, 101b, and 101c, the optical axes of the laser lights are aligned by the mirror 104 and the two dichroic mirrors 105a, 105b. The mirror 104 substantially totally reflects the red laser light transmitted through the collimator lens 102a. The dichroic mirror 105a reflects the green laser light transmitted through the collimator lens 102b, and transmits therethrough the red laser light reflected by the mirror 104. The dichroic mirror 105b reflects the blue laser light transmitted through the collimator lens 102c, and transmits therethrough the red laser light and the green laser light which have passed through the dichroic mirror 105a. The mirror 104 and the two dichroic mirrors 105a, 105b are disposed so as to align the optical axes of laser lights of respective colors emitted from the laser light sources 101a, 101b, and 101c.

The sampling mirror 106 transmits therethrough most of the red laser light, the blue laser light, and the green laser light which have passed through the dichroic mirror 105b, and reflects a part of each laser light (for example, about 3%) to the light detector 107. The light detector 107 outputs a detection signal in response to the light amount of the received laser light to an image control circuit 201.

The scanner 108 reflects the laser light of each color transmitted though the sampling mirror 106. The scanner 108 includes, for example, a micro electro mechanical system (MEMS) mirror, and rotates a mirror 108a onto which the laser light of each color transmitted through the sampling mirror 106 is made incident, around an axis parallel to an X-axis and an axis perpendicular to the X-axis and parallel to a reflection surface of the mirror 108a in response to a drive signal. The mirror 108a is rotated as described above, whereby the reflection direction of the laser light changes in a direction parallel to an X-Z plane and a direction parallel to a Y-Z plane. Thereby, as will be described later, the screens 110, 111 are two-dimensionally scanned by the laser light of each color.

Here, the scanner 108 includes the MEMS mirror of such a two-axis driving system, but the scanner 108 may have another configuration. For example, the scanner 108 may be configured by combining two mirrors rotated around two axes perpendicular to each other.

The correction lens 109 is designed to direct the laser light of each color in the positive direction of a Z-axis irrespective of a swing angle of the laser light by the scanner 108. The correction lens 109 is configured by combining a plurality of lenses, for example.

An image is formed on the screens 110, 111 by causing the laser light to scan the screens 110, 111, and the screens 110, 111 have a function to diffuse the laser light which is made incident thereonto, to a region (eye box region) around the position of the eye 2a of the driver 2. The screens 110, 111 may include a micro lens array, a diffusion board or the like. The screens 110, 111 may be made of a transparent resin such as polyethylene terephthalate (PET).

The screens 110, 111 are driven in a Z-axis direction, i.e., in a direction parallel to the traveling direction of the laser light of each color by an actuator 300. The screen 110 displays an image having parallax in a depth direction, and the screen 111 displays an image having no parallax in the depth direction. The screens 110, 111 are disposed so as to be separated from each other in the Z-axis direction in a state where the boundary substantially overlaps in a Y direction. The screens 110, 111 are integrally driven in the Z-axis direction by the actuator 300. The actuator 300 includes a coil and a magnetic circuit, for example, and an electromagnetic force generated in the coil drives a holder which holds the screens 110, 111. The configuration of the actuator 300 will be described later with reference to FIGS. 9A to 11B.

An image is drawn on the screen 110 by the laser light of each color while the screens 110, 111 move, whereby an image having parallax in the depth direction is displayed in front of the windshield 12. Thereby, the driver 2 can see an image of an arrow showing a traveling direction in a state where the image overlaps with a road, for example.

In a state where the screens 110, 111 are stopped at a predetermined position in the Z-axis direction, an image is drawn on the screen 111 by the laser light of each color, whereby an image having no parallax is displayed in front of the windshield 12. In this manner, the driver 2 can see a still image including information such as a vehicle speed or an outside air temperature at a certain depth of the windshield 12.

The image displayed on the whole of the screens 110, 111 configures an image of one frame. The configuration and scanning method of the screens 110, 111 will be described later with reference to FIGS. 3A and 3B.

The image control circuit 201 includes an arithmetic processing unit such as a central processing unit (CPU) and a memory, processes a video signal which is input thereto, and controls a laser drive circuit 202, a mirror drive circuit 203, and a screen drive circuit 204. As will be described later, the image control circuit 201 corrects a current value for driving the laser light sources 101a to 101c based on a light amount detected by the light detector 107 and an ambient temperature detected by a temperature sensor 121. This will be described later with reference to FIG. 4A to FIG. 7.

The laser drive circuit 202 changes the emission intensities of the laser light sources 101a, 101b, and 101c in response to a control signal input from the image control circuit 201. The mirror drive circuit 203 drives the mirror 108a of the scanner 108 in response to a control signal from the image control circuit 201. The screen drive circuit 204 drives the actuator 300 in response to the control signal from the image control circuit 201.

As shown in FIG. 2, the laser light sources 101a, 101b, and 101c are placed on one circuit board 120. The temperature sensor 121 for detecting a temperature (ambient temperature) near the placing position of the laser light sources 101a, 101b, and 101c is further placed on the circuit board 120. The temperature sensor 121 is placed around the laser light source 101a which emits red wavelength laser light. That is, the temperature sensor 121 is disposed at a position closer to the laser light source 101a than to the other two laser light sources 101b and 101c. A temperature sensor may be disposed for each of the laser light sources 101a, 101b, and 101c.

Furthermore, a light detector 130 for detecting brightness (external light) outside the vehicle is disposed. The detection signal from the light detector 130 is input into the image control circuit 201. The image control circuit 201 adjusts the luminance level of the image 30 so that an image is displayed with a high luminance level when it is bright outside the vehicle or with a low luminance level when it is dark outside the vehicle, based on the detection signal input from the light detector 130. In addition, the image control circuit 201 adjusts the luminance level of the image 30 based on the setting value of the luminance level set manually.

Figure 3A:
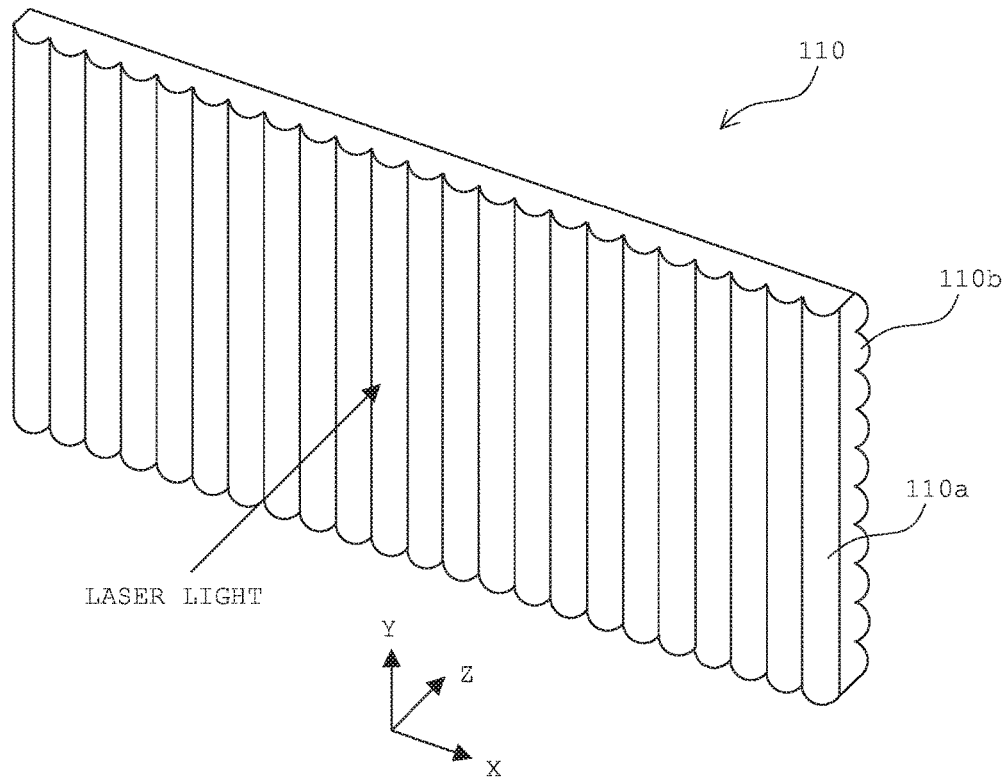
FIG. 3A is a perspective view schematically illustrating the incidence state of laser light with respect to a screen according to the embodiment 1.

FIG. 3A is a perspective view schematically illustrating the configuration of the screen 110.

As shown in FIG. 3A, a plurality of first lens parts 110a for diverging the laser light in the X-axis direction are formed on a surface of a laser light incident side of the screen 110 to be arranged at a constant pitch in the X-axis direction. The first lens parts 110a extend in parallel with the Y-axis direction. The shape of each of the first lens parts 110a as viewed in the Y-axis direction is an approximately circular arc shape. The width in the X-axis direction of each of the first lens parts 110a (pitch of the first lens parts 110a) is, for example, 50 µm.

A plurality of second lens parts 110b for diverging the laser light in the Y-axis direction are formed on a surface of a laser light emission side of the screen 110 so as to be arranged at a constant pitch in the Y-axis direction. The second lens parts 110b extend in parallel with the X-axis direction. The shape of each of the second lens parts 110b as viewed in the X-axis direction is a substantially circular arc shape. The width in the Y-axis direction (pitch of the second lens parts 110b) of each of the second lens parts 110b is, for example, 70 µm. The width in the Y-axis direction of each of the second lens parts 110b may be the same as the width in the X-axis direction of each of the first lens parts 110a.

A curvature radius Rx of each of the first lens parts 110a and a curvature radius Ry of each of the second lens parts 110b are different from each other. The curvature radius Rx is set smaller than the curvature radius Ry. Therefore, a divergence angle of the laser light diverged after the laser light is converged by the first lens parts 110a becomes larger than a divergence angle of the laser light diverged after the laser light is converged by the second lens parts 110b. The curvatures of each of the first lens parts 110a and the curvatures of each of the second lens parts 110b are set as described above, whereby the laser light transmitted through the screen 110 can be guided to the oblong region (eye box region) around the position of the eye 2a of the driver 2. The curvature radius of each of the first lens parts 110a and the curvature radius of each of the second lens parts 110b are determined in response to the shape of the eye box region.

The screen 111 also has the same configuration as that of the screen 110. The screen 111 has a shorter width in the Y-axis direction than that of the screen 110.

Figure 3B:
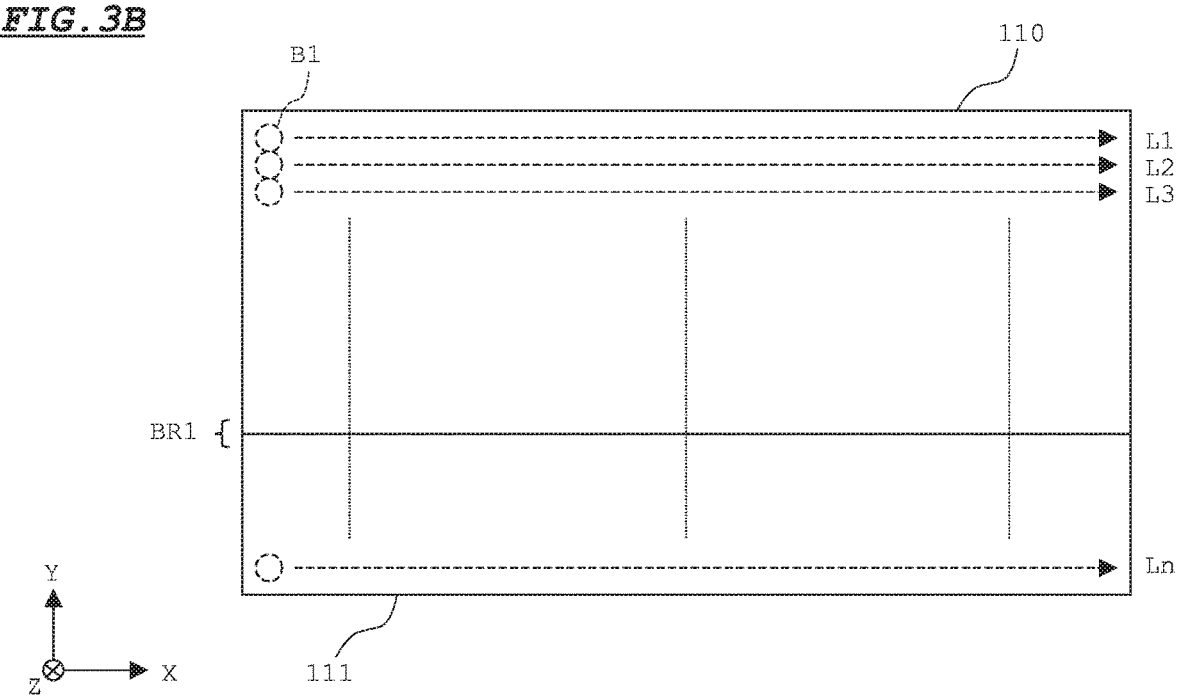
FIG. 3B is a diagram schematically illustrating the relationship between the screens and scan lines according to the embodiment 1.

FIG. 3B is a diagram schematically illustrating the relationship between the screens 110, 111 and scan lines.

Incident surfaces (surfaces on the negative side of the Z-axis) of the screens 110, 111 having the above-described configuration are scanned by beam B1 in which the laser lights of respective colors overlap one another. On the incident surfaces of the screens 110, 111, scan lines L1 to Ln through which the beam B1 passes are preliminarily set at a constant interval in the Y-axis direction. As described above, an image of one frame is drawn by the scan lines L1 to Ln.

The diameter of the beam B1 is set smaller than the width of each of the second lens parts 110b. For example, the diameter of the beam B1 is set to approximately 35 µm to 65 µm. In the present embodiment, the diameter of the beam B1 is smaller than not only the width of each of the second lens parts 110b but also the width of each of the first lens parts 110a.

The scan lines L1 to Ln set in this manner are scanned with the beam B1 in order from the positive side of a Y-axis. At each pixel position on the scan lines L1 to Ln, the laser light of each color is pulse-emitted at a predetermined pulse width from each of the laser light sources 101a to 101c. At this time, the output value of the pulse emission is adjusted in response to the gradation value (pixel value) of the luminance of the video signal at each pixel position. Specifically, the drive currents applied to the laser light sources 101a, 101b, and 101c are controlled in response to the video signal. The pulse width of the drive current is fixed to a predetermined value.

In this manner, the screens 110, 111 are two-dimensionally scanned by the beam B1, whereby an image of one frame is drawn on the screens 110, 111. A scanning cycle between the scan line L1 and the scan line Ln is 1/60 seconds, for example. As described above, an image for displaying an image having parallax in a depth direction is drawn on the screen 110, and an image for displaying an image having no parallax in the depth direction is drawn on the screen 111. A region in which the image on the screens 110, 111 is drawn has a shape distorted from a rectangular shape because of the distortion correction of the display image (image 30 in FIG. 1A).

The vicinity of a boundary BR1 between the screens 110, 111 in the Y-axis direction is not used for drawing the display image because of switching of the display image. That is, a video signal for drawing an image is not assigned to the scan line included in the vicinity of the boundary BR1.

In the present embodiment, the current values for driving the laser light sources 101a to 101c of respective colors are corrected using the scan line near the boundary BR1. That is, in the scan line near the boundary BR1, the laser light sources 101a to 101c of respective colors are pulse-emitted by a plurality of times in order to correct the current value which causes the laser light sources 101a to 101c of respective colors to emit light with a target light amount.

When the laser light sources 101a to 101c are caused to emit light near the boundary BR1 in this manner, a light shielding unit is preferably provided near the boundary BR1 so that the emitted laser light of each color is not guided to the eye box. In the present embodiment, a holder holding the screens 110, 111 includes a light shielding unit. The configuration of the light shielding unit will be described later with reference to FIGS. 11A and 11B.

Hereinafter, a method of correcting a current value for causing the laser light sources 101a to 101c to emit light with the target light amount will be described.

First, with reference to FIGS. 4A and 4B, a method of setting a current value before corrected will be described.

Figure 4A:
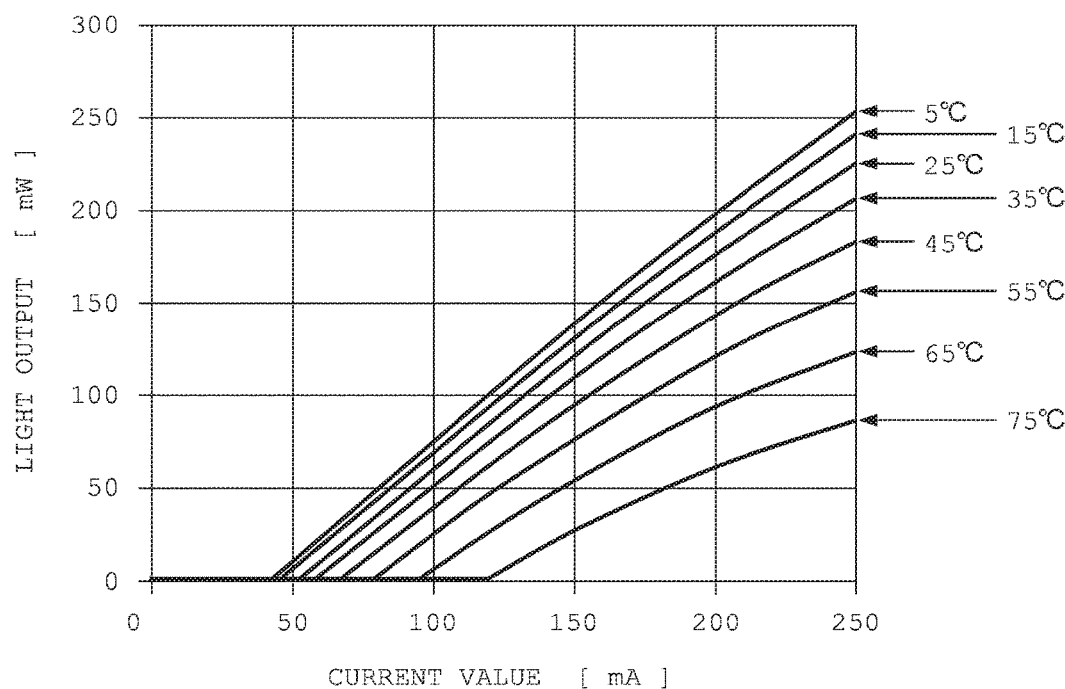
FIG. 4A is a diagram illustrating the reference output characteristic of a laser light source according to the embodiment 1.

FIG. 4A is a diagram illustrating the output characteristic of the laser light source 101a which emits red laser light. In FIG. 4A, a horizontal axis represents the current value of a drive current applied to the laser light source 101a, and a vertical axis represents the output value of the laser light emitted from the laser light source 101a. The output value of the laser light can be detected according to a light amount detection value output from the light detector 107 shown in FIG. 2.

As shown in FIG. 4A, the output characteristic of the laser light source 101a changes in response to the temperature of the laser light source 101a. Here, an ambient temperature near the laser light source 101a is used as the temperature of the laser light source 101a. The laser light source 101a does not substantially emit laser light in a current value range of from 0 to a predetermined value (light emitting threshold). When the current value exceeds the light emitting threshold, the output value of the laser light increases as the current value increases. As the temperature of the laser light source 101a increases, the light emitting threshold increases. As the temperature of the laser light source 101a increases, the inclination of a characteristic graph in a range in which the current value is more than the light emitting threshold decreases. Therefore, as the temperature of the laser light source 101a increases, the light output with respect to the same drive current decreases.

The output characteristic of each of the laser light sources 101b, 101c which emit blue laser light and green laser light also has the same tendency as that of FIG. 4A. For the output characteristics of the laser light sources 101b, 101c, the light emitting threshold and the inclination of the characteristic graph at each temperature are different from those of the laser light source 101a.

In the present embodiment, the current value of the laser light source 101a is set with the output characteristic shown in FIG. 4A as a reference output characteristic. That is, a current value I of the laser light source 101a with respect to a target light amount is set based on the following formula.

$$I = Ith + Iscale \times (pixel\ value) \quad (1)$$

Here, the pixel value is a gradation value of the luminance of the video signal at each pixel position of the image drawn on the screens 110, 111. The pixel value is a value corresponding to the target light amount.

Figure 4B:
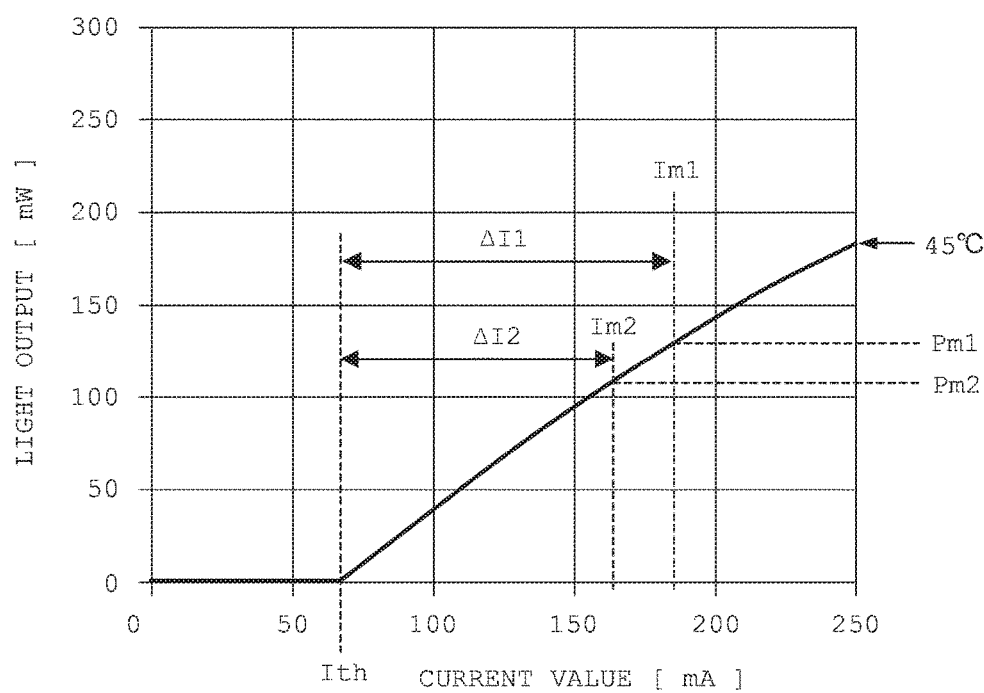
FIG. 4B is a diagram illustrating a method of setting a scale value (Iscale) according to the embodiment 1.

FIG. 4B is a diagram illustrating a method of setting the scale value (Iscale) of the formula (1). Here, it is presumed that the temperature of the laser light source 101a is 45° C.

In FIG. 4B, Pm1 represents a light output value (maximum light output value) corresponding to the highest luminance of the video signal when the image is displayed with a luminance level 1. Pm2 represents a light output value (maximum light output value) corresponding to the highest luminance of the video signal when the image is displayed with a luminance level 2 darker than the luminance level 1. As described above, the luminance level of the image is increased when it is bright outside the vehicle, and the luminance level of the image is decreased when it is dark outside the vehicle. The luminance level can be set to about ten stages, for example.

Here, with the luminance level 1, a value obtained by dividing the maximum light output Pmt by the gradation number of the luminance (for example, 256 gradations) is the change amount of the light output value per one gradation. With the luminance level 1, a value obtained by dividing a difference ΔI1 between a current value Im1 on the output characteristic corresponding to the maximum light output Pm1 and the current value (Ith) of the light emitting threshold (hereinafter, referred to as a "threshold current value (Ith)") by the gradation number of the luminance (for example, 256 gradations) is the change amount of the current value per one gradation. The change amount of the current value per one gradation is the scale value (Iscale) of the formula (1) with the luminance level 1 and the light source temperature of 45° C. That is, the scale value (Iscale) is a value reflecting inclination when the characteristic graph of the output characteristic is linearly approximated.

Similarly, with the luminance level 2, a value obtained by dividing a difference ΔI2 between a current value Im2 on the output characteristic corresponding to the maximum light output Pm2 and the current value (Ith) of the light emitting threshold by the gradation number of the luminance (for example, 256 gradations) is the change amount of the current value per one gradation. The change amount of the current value per one gradation is the scale value (Iscale) of the formula (1) with the luminance level 2 and the light source temperature of 45° C. The difference ΔI2 of the current value with the luminance level 2 is smaller than the difference ΔI1 of the current value with the luminance level 1, whereby the scale value (Iscale) with the luminance level 2 is smaller than the scale value (Iscale) with the luminance level 1. That is, as the luminance level is smaller, the scale value (Iscale) is smaller.

In this manner, by setting the scale value (Iscale), the current value of the laser light source 101a for causing the laser light source 101a to emit light with the target light amount corresponding to the pixel value (gradation value) can be obtained according to the arithmetic operation of the formula (1). As described above, as the luminance level is lower, the scale value (Iscale) is smaller. As shown in FIG. 4A, as the temperature of the laser light source 101a changes, the inclination of the output characteristic changes. For this reason, as the temperature of the laser light source 101a changes, the scale value (Iscale) changes. As the temperature of the laser light source 101a changes, the threshold current value (Ith) of the output characteristic also changes.

The image control circuit 201 shown in FIG. 2 preliminarily holds a look-up table causing the threshold current value (Ith) and the scale value (Iscale) to correspond to the temperature of the laser light source 101a and the luminance level of the image in order to obtain the current value of the laser light source 101a according to the arithmetic operation of the formula (1).

FIG. 5 is a diagram illustrating the configuration of the look-up table for setting the threshold current value (Ith) and the scale value (Iscale). Also in FIG. 5, the ambient temperature near the laser light source 101a is used as the temperature of the laser light source 101a.

The image control circuit 201 sets the luminance level of the image based on a detection signal (brightness outside a vehicle) from the light detector 130, and furthermore obtains the ambient temperature of the laser light source 101a based on a detection signal from the temperature sensor 121. The image control circuit 201 respectively obtains the threshold current value (Ith) and the scale value (Iscale) corresponding to the set luminance level and the obtained ambient temperature from the look-up table shown in FIG. 5, and sets the obtained threshold current value (Ith) and scale value (Iscale) as parameters of the formula (1). When the ambient temperature is between temperatures specified in the look-up table, a threshold current value (Ith) and a scale value (Iscale) corresponding to a temperature on the look-up table closest to the ambient temperature are obtained.

Thereafter, the image control circuit 201 substitutes the pixel value (gradation value) of the video signal for the formula (1), to obtain a current value I for each pixel according to an arithmetic operation. The image control circuit 201 controls the laser drive circuit 202 with the obtained current value I as the drive current value of the laser light source 101a at each pixel position.

Also for the laser light sources 101b, 101c respectively outputting blue laser light and green laser light, look-up tables having the same configuration as that of FIG. 5 are held in the image control circuit 201. The threshold current value (Ith) and the scale value (Iscale) obtained based on the reference output characteristics of the laser light sources 101b, 101c are held so as to correspond to a temperature and a luminance level in the look-up tables.

The image control circuit 201 obtains the current value I at each pixel position of the laser light sources 101b, 101c according to the same processing as described above with reference to the look-up tables, and drives the laser light sources 101b, 101c at the obtained current value I. In this manner, by driving the laser light sources 101a to 101c, the image is displayed with the set luminance level.

However, factors such as a manufacturing error and aged deterioration of the laser light sources 101a to 101c may cause the deviation of an actual output characteristic from the reference output characteristic corresponding to the look-up table. In this case, when the current values of the laser light sources 101a to 101c are set according to the same processing as described above, a difference occurs between the emission light amount of each of the laser light sources 101a to 101c and the target light amount corresponding to each pixel value, which may cause problems in the brightness and shade of the image.

Therefore, in the present embodiment, the threshold current value (Ith) and the scale value (Iscale) are corrected as needed according to the following processing.

Figure 6A:
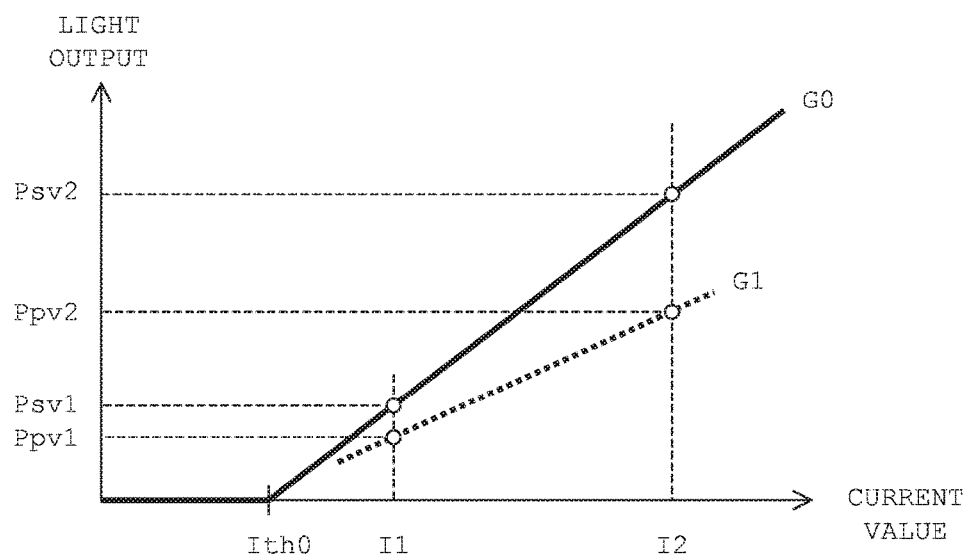
FIG. 6A is a diagram illustrating the deviation between the reference output characteristic of the laser light source and an output characteristic based on actual measurement according to the embodiment 1.

FIG. 6A is a diagram illustrating the deviation between the reference output characteristic of the laser light source 101a and an output characteristic based on actual measurement.

In FIG. 6A, G0 represents the reference output characteristic (hereinafter, referred to as "reference characteristic") of the laser light source 101a. The reference characteristic G0 of FIG. 6A represents the output characteristic of the laser light source 101a with a predetermined luminance level and a predetermined ambient temperature. In correction, first, two light output values (Psv1, Psv2) and two current values (I1, I2) are set in the reference characteristic G0. The current value (I1) is a current value on the reference characteristic G0 with respect to the low level side light output value (Psv1). The current value (I2) is a current value on the reference characteristic G0 with respect to the high level side light output value (Psv2).

Next, the laser light source 101a is pulse-emitted at the set two current values (I1, I2). Light output values (Ppv1, Ppv2) actually occurring when the laser light source 101a is pulse-emitted at the two current values (I1, I2) are obtained based on a detection signal output from the light detector 107 in each pulse emission. A straight line passing plots including the light output values (Ppv1, Ppv2) and the two current values (I1, I2) obtained in this manner represents the characteristic (hereinafter, referred to as "guessed characteristic") G1 of the laser light source 101a guessed from actual output. Here, deviation occurs between the guessed characteristic G1 and the reference characteristic G0. This makes it necessary to correct the threshold current value (Ith) and the scale value (Iscale) obtained from the look-up table so that the deviation is eliminated.

Therefore, first, in order to correct the scale value (Iscale), a ratio of the inclination of the guessed characteristic G1 to the inclination of the reference characteristic G0 is determined as a correction multiplier α of the scale value (Iscale). The inclination of the reference characteristic G0 and the inclination of the guessed characteristic can be determined according to the following formulae.

$$\text{Inclination of Reference Characteristic } G0 = (Psv2 - Psv1)/(I2 - I1) \quad (2)$$

$$\text{Inclination of Guessed Characteristic } G1 = (Ppv2 - Ppv1)/(I2 - I1) \quad (3)$$

Since the correction multiplier α is (inclination of reference characteristic G0)/(inclination of guessed characteristic G1), the correction multiplier α can be determined according to the following formula.

$$\alpha = (Psv2 - Psv1)/(Ppv2 - Ppv1) \quad (4)$$

Next, in order to correct the threshold current value (Ith), the inclination of the guessed characteristic G1 is aligned with the inclination of the reference characteristic G0, to obtain a virtual characteristic G2.

Figure 6B:
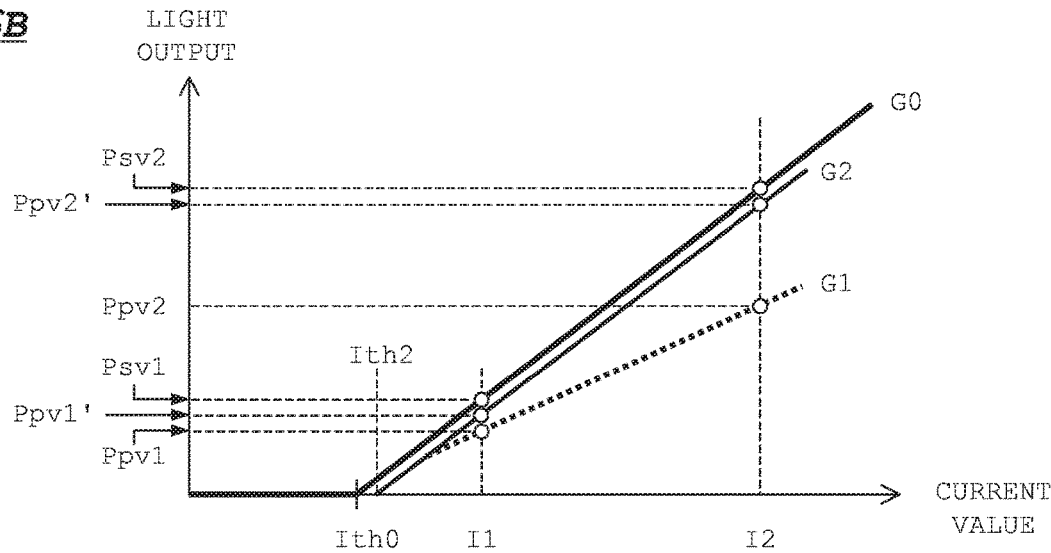
FIG. 6B is a diagram illustrating an output characteristic of which the inclination based on the actual measurement of the laser light source is corrected according to the embodiment 1.

FIG. 6B is a diagram illustrating the virtual characteristic G2 overlaid on the graph of FIG. 6A. Here, light output values (Ppv1', Ppv2') are light output values on the virtual characteristic G2 corresponding to the current values (I1, I2). The light output values (Ppv1', Ppv2') can be determined according to the following formulae.

$$Ppv1'=\{(Psv2-Psv1)/(Ppv2-Ppv1)\} \times Ppv1 \quad (5)$$

$$Ppv2'=\{(Psv2-Psv1)/(Ppv2-Ppv1)\} \times Ppv2 \quad (6)$$

Figure 6C:
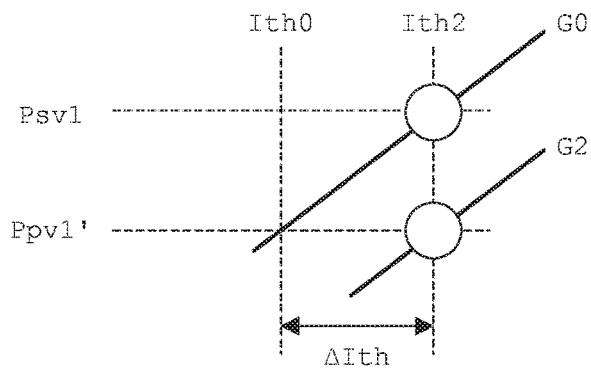
FIG. 6C is a diagram illustrating the deviation amount of the current value of a light emitting threshold between the reference output characteristic and the corrected output characteristic according to the embodiment 1.

A difference between the threshold current value in the guessed characteristic G1 and the threshold current value in the reference characteristic G0 can be determined according to a difference (ΔIth) between a threshold current value (Ith2) in the virtual characteristic G2 and a threshold current value (Ith0) in the reference characteristic G0. Here, the difference (ΔIth) is a value obtained by dividing the difference between the light output value (Psv1) and the light output value (Ppv1') by the inclination of the reference characteristic G0, as shown in FIG. 6C. Therefore, the difference (ΔIth) may be determined according to the following formula.

$$\Delta Ith=\{(I2-I1) \times (Psv1-Ppv1')\}/(Psv2-Psv1) \quad (7)$$

The image control circuit 201 shown in FIG. 2 multiplies the scale value (Iscale) obtained from the look-up table of FIG. 5 by the correction multiplier α determined according to the arithmetic operation of the formula (4), to obtain a corrected scale value (Iscale'). The image control circuit 201 adds the difference (ΔIth) determined according to the arithmetic operation of the formula (7) to the threshold current value (Ith) obtained from the look-up table of FIG. 5, to obtain a corrected threshold current value (Ith'). The image control circuit 201 applies the corrected scale value (Iscale') and the corrected threshold current value (Ith') to the parameters (Ith, Iscale) of the formula (1), to obtain a current value I for outputting the target light amount corresponding to the pixel value. Thereby, the current value I aligned with the actual output characteristic of the laser light source 101a can be set. The other laser light sources 101b, 101c are also subjected to the same processing.

In the correction, a low output side light output value (Isv1), a current value (I1), a high output side light output value (Isv2), and a current value (I2) set in the reference characteristic G0 are preferably changed for each luminance level and temperature.

Figures 7A, 7B:
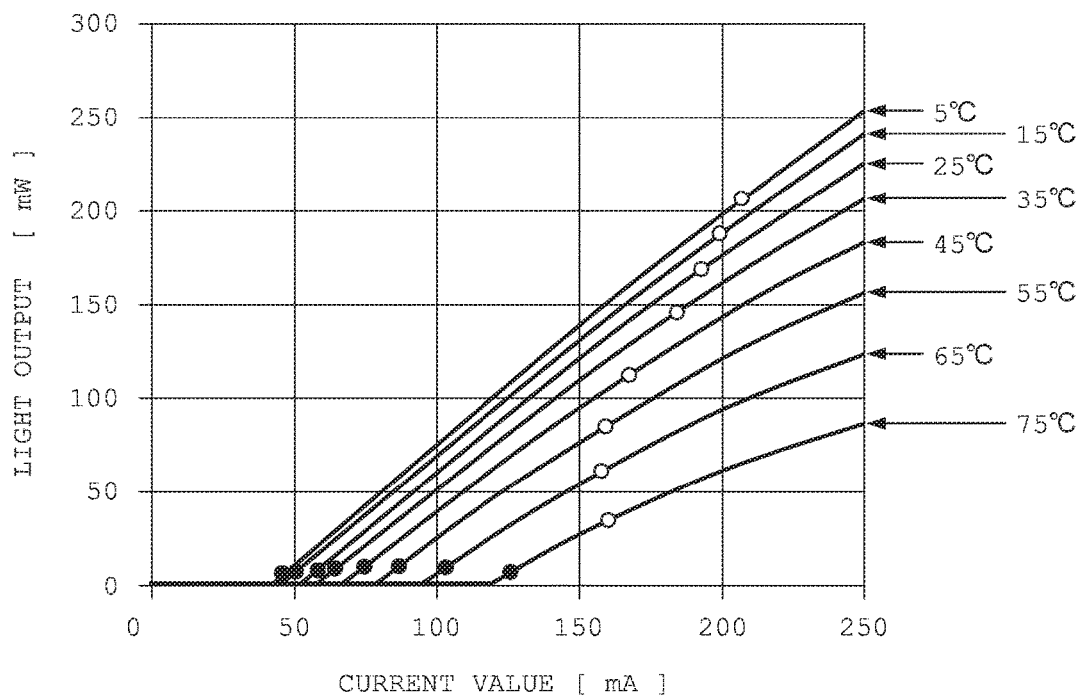
FIG. 7A is a diagram in which a low output side setting value and a high output side setting value are respectively plotted in an output characteristic at each temperature with a predetermined luminance level according to the embodiment 1.
FIG. 7B is a diagram illustrating the configuration of a look-up table in which a high output side setting value and a low output side setting value set at each ambient temperature are specified for each luminance level according to the embodiment 1.

FIG. 7A is a diagram in which the low output side setting values (Psv1, I1) and the high output side setting values (Psv2, I2) are plotted in the output characteristic of each temperature with a predetermined luminance level. In FIG. 7A, the low output side setting values are represented by black circle plots, and the high output side setting values are represented by white circle plots.

As shown in FIG. 7A, the reference characteristic of the laser light source 101a forms a slightly curved line in a range in which the current value is more than the threshold current value. Meanwhile, in the formula (1), the reference characteristic in the range is linearly approximated to determine the current value I. Therefore, the low output side setting values (Psv1, I1) and the high output side setting values (Psv2, I2) are preferably set in a range in which the linearity of the reference characteristic is high so as to approach the straight line approximated in the formula (1) as closely as possible. From this viewpoint, in the example of FIG. 7A, particularly, the high output side setting values largely change for each temperature.

As described with reference to FIG. 4B, the maximum light output values (Pm1, Pm2) and the maximum current values (Im1, Im2) are different for each luminance level. Therefore, the high output side setting values (Psv2, I2) are preferably set so as not to exceed at least the maximum light output value and the maximum current value with each luminance level.

Thus, the low output side setting values and the high output side setting values in the correction are preferably adjusted to appropriate values in response to temperatures and luminance levels. Therefore, in the present embodiment, the look-up table causing the low output side setting values and the high output side setting values to correspond to the ambient temperatures and luminance levels of the laser light sources 101a to 101c is held in the image control circuit 201.

FIG. 7B is a diagram illustrating the configuration of a look-up table in which high output side setting values and low output side setting values set at each ambient temperature are specified for each luminance level. The look-up table is used for the laser light source 101a, for example. Also for the other laser light sources 101b, 101c, the look-up tables having the same configuration are held in the image control circuit 201.

The image control circuit 201 sets the luminance level of the image based on the detection signal (brightness outside a vehicle) from the light detector 130, and furthermore obtains the ambient temperature of the laser light source 101a based on the detection signal from the temperature sensor 121. The image control circuit 201 obtains the low output side setting values and the high output side setting values corresponding to the set luminance level and the obtained ambient temperature from the look-up table shown in FIG. 7B, and performs the correction processing using the obtained low output side setting values and high output side setting values. When the detected ambient temperature is between temperatures specified in the look-up table, the low output side setting values and the high output side setting values corresponding to a temperature on the look-up table closest to the ambient temperature are obtained. The other laser light sources 101b, 101c are also subjected to the same processing.

Figure 8:
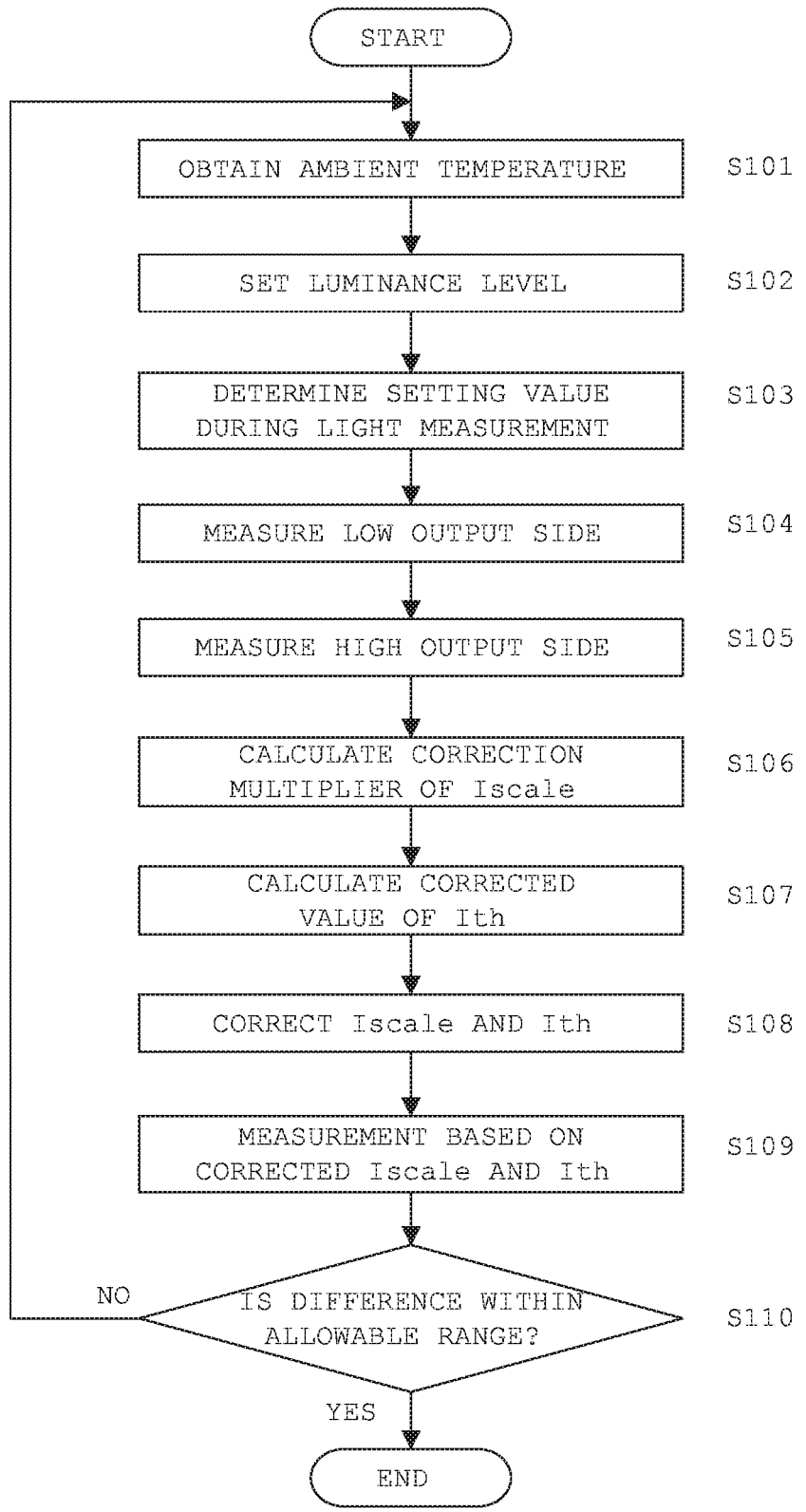
FIG. 8 is a flow chart illustrating the correction processing of the current value of the laser light source according to the embodiment 1.

FIG. 8 is a flow chart showing the correction processing of the current value of the laser light source 101a. The other laser light sources 101b, 101c are also subjected to the same processing.

The image control circuit 201 obtains the ambient temperature near the laser light source 101a based on the detection signal of the temperature sensor 121 (S101), and furthermore sets the luminance level of the image based on the detection signal (brightness outside a vehicle) of the light detector 130 (S102). Next, the image control circuit 201 obtains the low output side setting values and the high output side setting values corresponding to the obtained ambient temperature and luminance level from the look-up table shown in FIG. 7B (S103).

Thereafter, the image control circuit 201 pulse-emits the laser light source 101a at the low output side setting value (I1) at a timing when a scanning position is on the scan line near the boundary BR1 between the screens 110, 111, to perform low output side measurement (S104), and furthermore, pulse-emits the laser light source 101a at the high output side setting value (I2) to perform high output side measurement (S105). Specifically, the image control circuit 201 obtains the light output value of the laser light source 101a for each pulse emission based on the detection signal output from the light detector 107 during each pulse emission.

The image control circuit 201 calculates the correction multiplier α of the scale value (Iscale) according to the arithmetic operation of the formula (4) based on the light output value obtained based on the low output side setting value, and the light output value obtained based on the high output side setting value (S106), and furthermore calculates the corrected value (difference ΔIth) of the threshold current value (Ith) according to the arithmetic operation of the formula (7) (S107). The image control circuit 201 corrects the scale value (Iscale) and the threshold current value (Ith) obtained from the look-up table of FIG. 5 using the obtained correction multiplier α and corrected value (difference ΔIth) (S108). Specifically, the image control circuit 201 multiplies the scale value (Iscale) by the correction multiplier α to calculate the corrected scale value (Iscale), and adds the corrected value (difference ΔIth) to the threshold current value (Ith) to calculate the corrected threshold current value (Ith).

Thereafter, the image control circuit 201 applies the corrected scale value (Iscale) and the corrected threshold current value (Ith) to the formula (1) in order to confirm whether or not the correction is appropriate, thereby measuring the light output value (S109). In this case, for example, the image control circuit 201 applies the pixel value (gradation) corresponding to the high output side setting value (Psv2) to the formula (1) to obtain the current value, and pulse-emits the laser light source 101a at the obtained current value. This pulse emission is also performed on the scan line near the boundary BR1 between the screens 110, 111.

The image control circuit 201 obtains the light output value of the laser light source 101a based on the detection signal output from the light detector 107 during the pulse emission, and determines whether the difference between the obtained light output value and high output side setting value (Psv2) is within a preliminarily set allowable range (S110).

When the difference is within the allowable range (S110: YES), the image control circuit 201 determines that the correction multiplier α and the corrected value (ΔIth) determined in steps S106 and S107 are appropriate, and ends the correction processing. In this case, the correction multiplier α and the corrected value (ΔIth) obtained in steps S106 and S107 are determined, and the correction of step S108 is also determined. Thereafter, a current value is set in the laser light source 101a based on the formula (1) after the correction determined in step S108 before the next correction.

On the other hand, when the difference is not within the allowable range (S110: NO), the image control circuit 201 determines that the correction multiplier α and the corrected value (ΔIth) determined in steps S106 and S107 are not appropriate, and returns the processing to step S101. In this case, the correction multiplier α and the corrected value (ΔIth) determined in steps S106 and S107 are cancelled, and the correction of step S108 is also cancelled. Thereafter, the image control circuit 201 repeats the processings of steps S101 to S109 until the determination in step S110 becomes YES.

In this manner, when the determination of step S110 becomes YES, the image control circuit 201 ends the correction processing. Thereby, the correction multiplier α and the corrected value (ΔIth) are determined, and the current value of the laser light source 101a is set according to the arithmetic operation of the formula (1) using the corrected scale value (Iscale) and threshold current value (Ith). The other laser light sources 101b, 101c are also subjected to the same processing.

The correction processing of FIG. 8 is performed at a preliminarily set timing. For example, the correction processing of FIG. 8 may be performed for each frame, or may be performed every few frames.

Next, a configuration for shielding laser light (hereinafter, referred to as "laser light for adjusting an output value") pulse-emitted in the correction processing will be described.

In the present embodiment, the configuration shielding the laser light for adjusting an output value is provided in the holder holding the screens 110, 111. Here, the holder is driven in the Z-axis direction (direction parallel to the traveling direction of the laser light) together with the screens 110, 111 by the actuator 300 shown in FIG. 1. Hereinafter, the configuration for shielding the laser light for adjusting an output value together with the configuration of the actuator 300 will be described.

Figure 9A:
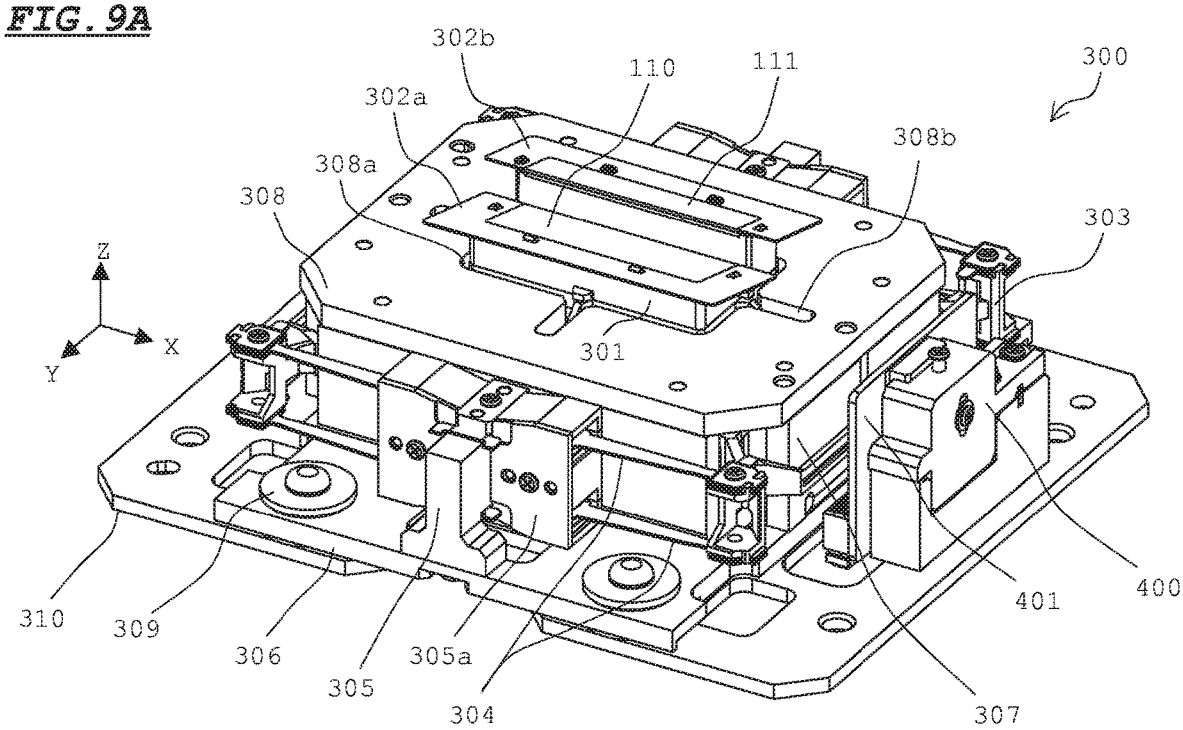
FIG. 9A is a perspective view illustrating the configuration of an actuator driving the screen according to the embodiment 1.
Figure 9B:
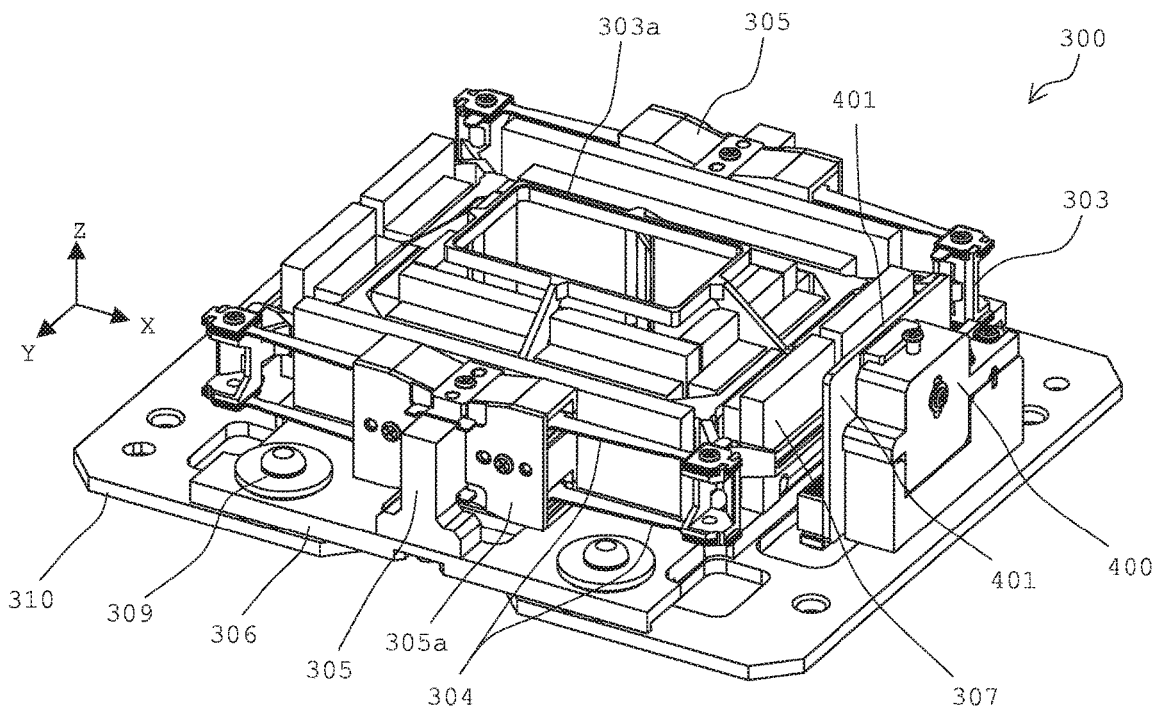
FIG. 9B is a perspective view illustrating the configuration of an actuator driving the screen according to the embodiment 1.

FIG. 9A is a perspective view illustrating the configuration of the actuator 300, and FIG. 9B is a perspective view illustrating the configuration of the actuator 300 with a magnetic cover 308 and a holder 301 being detached.

The actuator 300 supported by a support base 306 and a fixed base 310 is shown in FIGS. 9A and 9B. An opening for passing the laser light of each color in the Z-axis direction is provided in the support base 306 and the fixed base 310. The laser light of each color is irradiated to the screens 110, 111 from the negative side of the Z-axis via the opening.

As shown in FIG. 9A, the screens 110, 111 are integrally supported by the holder 301 so that the screens 110, 111 are inclined in the same direction. The two screens 110, 111 are arranged in the direction (Y-axis direction) perpendicular to the traveling direction (the Z-axis direction) of the laser light, and placed so that the screens 110, 111 are deviated from each other by a predetermined distance in the traveling direction (Z-axis direction) of the laser light. Shielding members 302a, 302b are placed on the upper surface of the holder 301. The shielding members 302a, 302b prevent external light reversing the optical system of FIG. 1C from entering into the actuator 300.

The holder 301 on which the screens 110, 111 are placed is placed in an inner frame 303a of a support member 303 shown in FIG. 9B. The support member 303 is supported, movably in the Z-axis direction, on two support units 305 aligned in the Y-axis direction via four suspensions 304. The support units 305 are placed on a support base 306. Each of the support units 305 includes a gel cover 305a on each of the positive and negative sides of the X-axis. A gel for dumping is filled in each of the gel covers 305a.

In this manner, the screens 110, 111 are supported, movably in the Z-axis direction, on the support base 306 via the holder 301, the support member 303, the suspensions 304, and the support units 305.

The support base 306 further includes a magnetic circuit 307. The magnetic circuit 307 applies a magnetic field to a coil 311 (shown in FIG. 10A) mounted on the support member 303. When a drive signal (current) is applied to the coil 311, an electromagnetic force in the Z-axis direction is excited in the coil 311. Thereby, the support member 303 is driven together with the coil 311 in the Z-axis direction. In this manner, the screens 110, 111 move in the Z-axis direction.

A magnetic cover 308 is put on the upper surface of the magnetic circuit 307. The magnetic cover 308 is made of a magnetic material, and functions as a yoke of the magnetic circuit 307. When the magnetic cover 308 is put on the upper surface of the magnetic circuit 307, the magnetic cover 308 is attracted to the magnetic circuit 307. Thereby, the magnetic cover 308 is placed on the actuator 300. As shown in FIG. 9A, an opening 308a through which the holder 301 passes and a slit 308b through which a beam 303c of the support member 303 (see FIG. 10A) passes are formed in the magnetic cover 308.

The support base 306 is placed on the fixed base 310 via damper units 309. The damper units 309 support the support base 306 in a state where the support base 306 is kept in suspension in the positive direction of the Z-axis with respect to the fixed base 310. The damper units 309 absorb the vibration generated in association with the driving of the support member 303 before the vibration is transmitted from the support base 306 to the fixed base 310.

On the fixed base 310, a position detection unit 400 is further placed. The position detection unit 400 includes a printed circuit board 401 facing a side surface, on the positive side of the X-axis of the support member 303. An encoder (not shown) is disposed on a surface, on the negative side of the X-axis of the printed circuit board 401. The encoder detects the position of the support member 303 in the Z-axis direction.

Figure 10A:
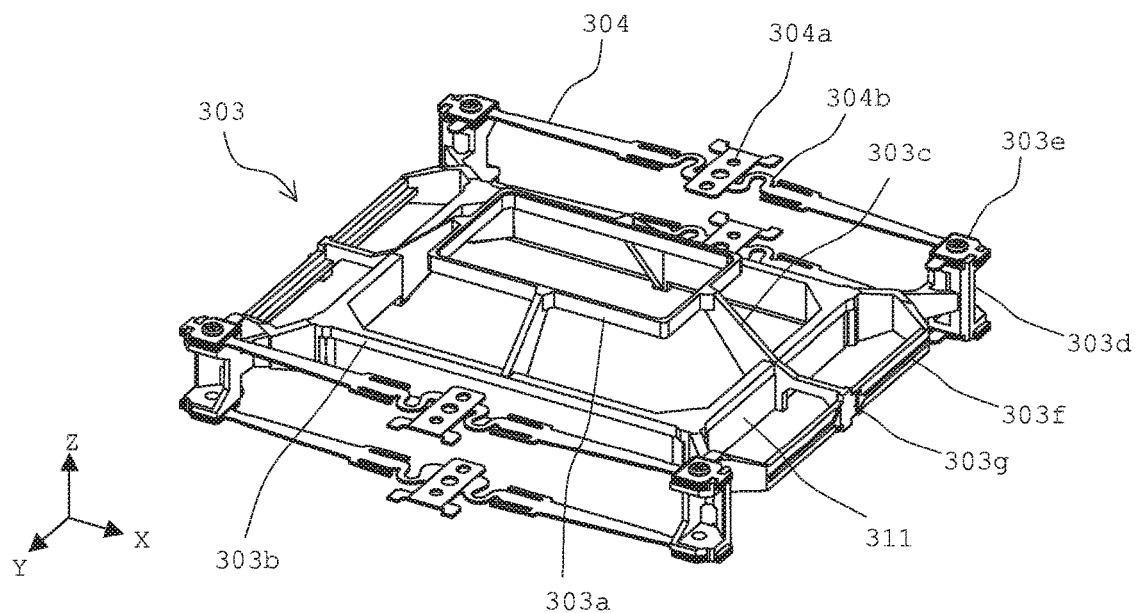
FIG. 10A is a perspective view illustrating the configuration of a support member and a suspension according to the embodiment 1 in a state where the support member and the suspension are assembled.

FIG. 10A is a perspective view illustrating the configuration of the support member 303 and the suspension 304 in a state where the support member 303 and the suspension 304 are assembled.

As shown in FIG. 10A, the support member 303 has a frame shape. The support member 303 is formed of a lightweight material having high rigidity. The support member 303 includes an inner frame 303a and an outer frame 303b both in an approximately rectangular shape in plan view. The inner frame 303a and the outer frame 303b are connected to each other with the four beams 303c so that the center of the inner frame 303a and the center of the outer frame 303b coincide with each other in plan view. The inner frame 303a is positioned above (in the positive direction of the Z-axis) the outer frame 303b.

The holder 301 is placed on the upper surface of the inner frame 303a. The coil 311 is mounted on the lower surface of the outer frame 303b. The coil 311 has a shape in which four corners of a rectangle are rounded along the lower surface of the outer frame 303b.

Each of connection members 303d is formed to extend from each of four corners of the outer frame 303b in a radial fashion. Each of the connection members 303d has a flange on each of upper ends and lower ends. On the upper surface of the flange on the upper side of each of the connection members 303d, an end of the upper suspension 304 is fixed with a fixing member 303e. On the lower surface of the flange on the lower side of each of the connection members 303d, an end of the lower suspension 304 is fixed with a fixing member 303e. In this manner, the suspensions 304 are mounted on the support member 303.

Furthermore, the support member 303 includes bridges 303f each connecting the connection members 303d which are adjacent to each other in the Y-axis direction. A portion of each of the bridges 303f excluding both ends in the Y-axis direction extends parallel to the Y-axis direction, and at the center of the portion, a mounting surface 303g parallel to a Y-Z plane is provided. A scale is placed on the mounting surface 303g of the bridges 303f, on the positive side of the X-axis, of the support member 303. The scale faces the encoder of the position detection unit 400 shown in FIGS. 9A and 9B. In this manner, the position of the support member 303 in the Z-axis direction is detected by the encoder.

Each of the suspensions 304 has three holes 304a, at the central position in the X-axis direction. Each of the suspensions 304 has a crank-shaped elastic structure 304b on each of both sides of the three holes 304a. The two suspensions 304 on the positive side of the Y-axis and the two suspensions 304 on the negative side of the Y-axis are mounted on the support units 305 via the three holes 304a as shown in FIGS. 9A and 9B.

Figure 10B:
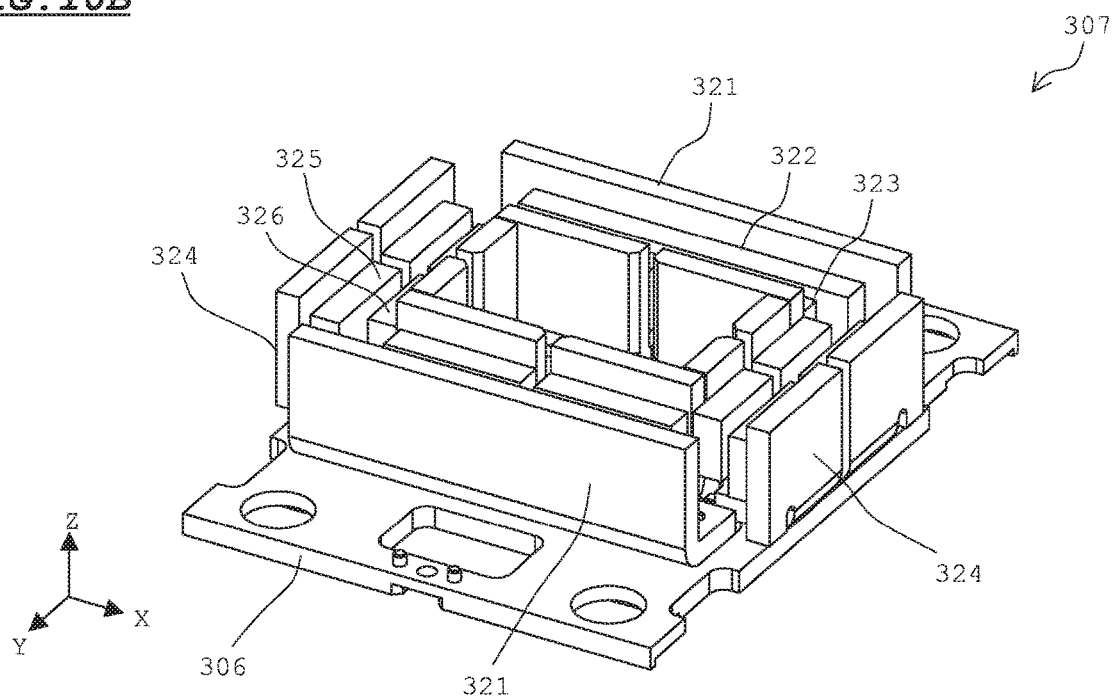
FIG. 10B is a perspective view illustrating the configuration of a magnetic circuit according to the embodiment 1.

FIG. 10B is a perspective view illustrating the configuration of the magnetic circuit 307. A state where the magnetic circuit 307 is placed on the upper surface of the support base 306 is shown in FIG. 10B.

The magnetic circuit 307 includes two yokes 321 arranged in the Y-axis direction. The yokes 321 have a U-shape when viewed in the X-axis direction. An inner wall part 321b of each of the two yokes 321 is separated in two pieces. A magnet 322 is placed inside an outer wall part 321a of each of the yokes 321. A magnet 323 is placed to face the magnet 322 outside each of the two wall parts 321b inside each of the yokes 321. Between the magnet 322 and the magnet 323 facing each other, there is a gap into which the above-mentioned coil 311 is inserted.

Furthermore, the magnetic circuit 307 includes two yokes 324 arranged in the X-axis direction. The yokes 324 have a U-shape when viewed in the Y-axis direction. An outer wall part 324a of each of the two yokes 324 is separated in two pieces, and an inner wall part 324b of each of the two yokes 324 is also separated in two pieces. A magnet 325 is placed inside each of the two wall parts 324a outside each of the yokes 324. A magnet 326 is placed outside of each of the two wall parts 324b inside of each of the yokes 324 to face the magnet 325. Between the magnet 325 and the magnet 326 facing each other, there is a gap into which the above-mentioned coil 311 is inserted. An end of the magnets 326 in the Y-axis direction overlaps a side surface of the inner wall part 321b of the adjacent yokes 321.

Figure 11A:
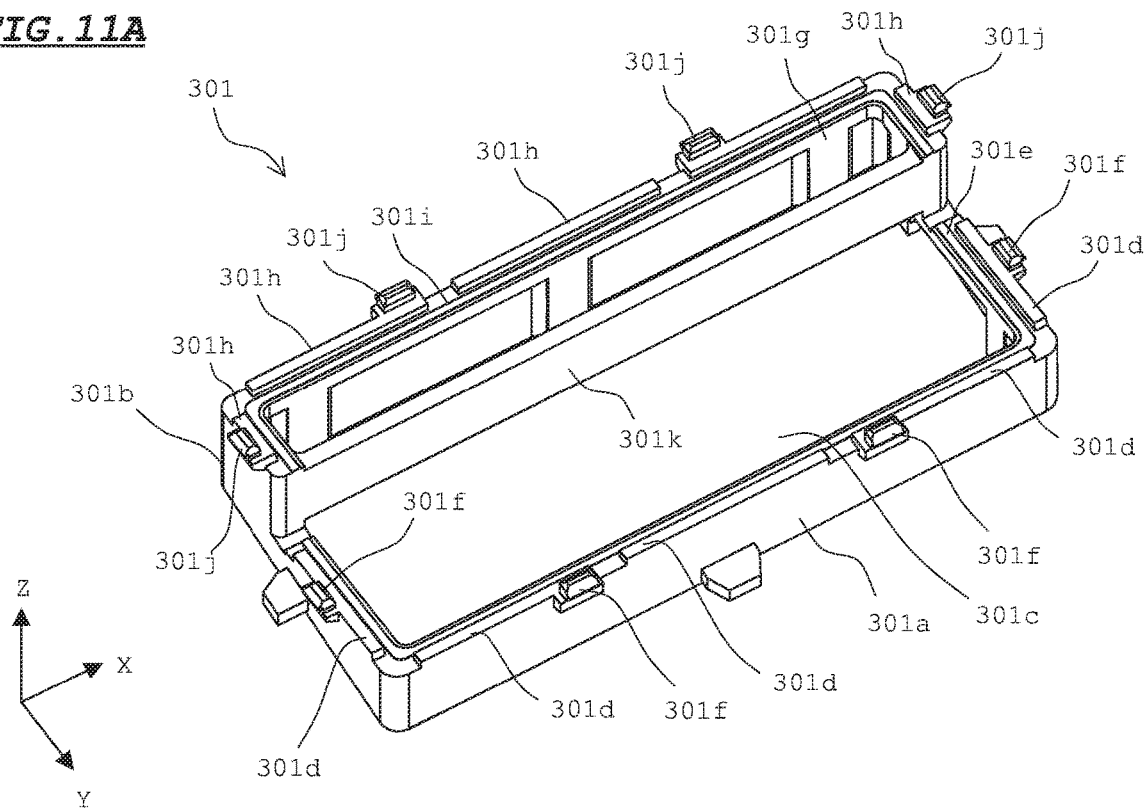
FIG. 11A is a perspective view illustrating the configuration of a holder according to the embodiment 1.
Figure 11B:
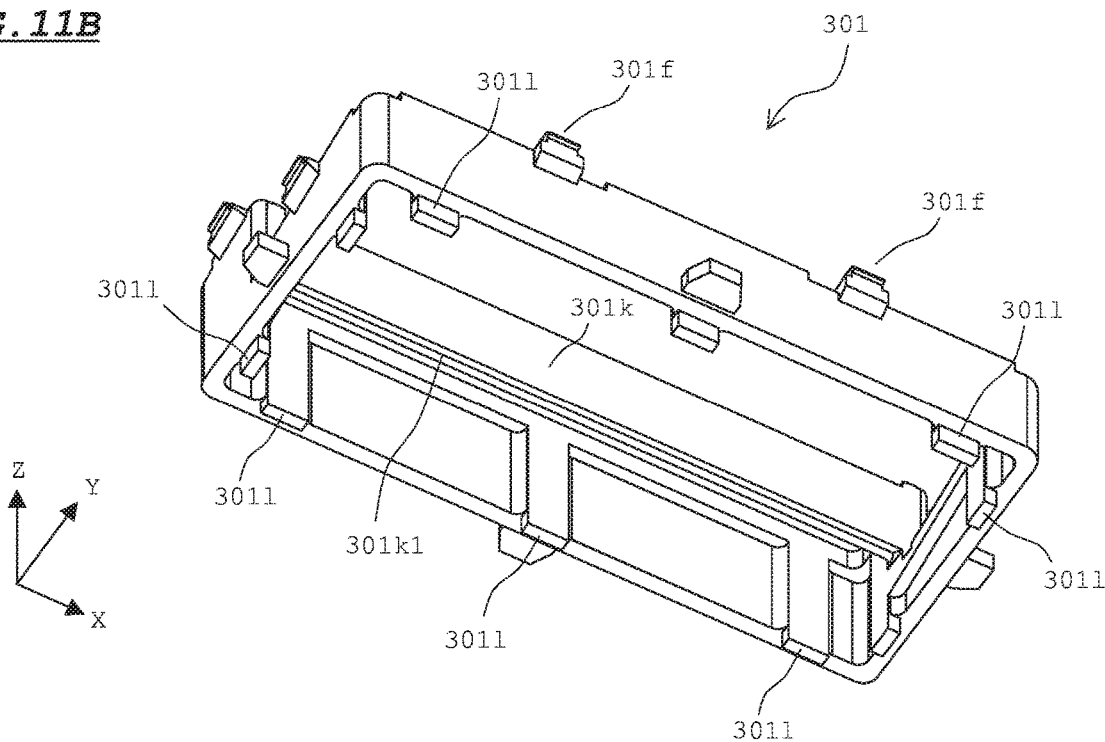
FIG. 11B is a perspective view illustrating the configuration of a holder according to the embodiment 1.

FIGS. 11A and 11B are perspective views illustrating the configuration of the holder 301. FIG. 11A is a perspective view of the holder 301 as viewed from the upper side, and FIG. 11B is a perspective view of the holder 301 as viewed from the lower side.

The holder 301 is a frame-shaped member. The holder 301 is formed of a lightweight material with high rigidity. The holder 301 is preferably configured to suppress surface reflection. This can suppress stray light caused by the reflection of the laser light for adjusting an output value on the holder 301. The holder 301 preferably has a black color surface to increase light absorptivity. In the present embodiment, the holder 301 is integrally formed of a magnesium alloy. Furthermore, the surface of the holder 301 is subjected to black oxide processing. The surface of the holder 301 may be subjected to emboss processing to suppress surface reflection. The holder 301 may be formed of a material other than magnesium such as aluminum. The holder 301 has a shape symmetric with respect to the X-axis direction.

The holder 301 includes a lower frame part 301a for supporting the screen 110, and an upper frame part 301b for supporting the screen 111.

The lower frame part 301a has a rectangular opening 301c in plan view. Three walls 301d projected upward are provided on an edge portion on the positive side of the Y-axis on an upper surface of the lower frame part 301a. A wall 301d is provided also on an edge portion on each of the positive and negative sides of the X-axis on the upper surface of the lower frame part 301a. Furthermore, a projection 301e projected upward is provided between each of the walls 301d and the opening 301c. The projection 301e is continuously formed along the periphery edge of the opening 301c. The height of the projection 301e is lower than that of the wall 301d. Four hooks 301f projected in the Z-axis direction are provided outside the wall 301d on the upper surface of the lower frame part 301a.

The upper frame part 301b has a rectangular opening 301g in plan view. Three walls 301h projected upward are provided on an edge portion on the negative side of the Y-axis on an upper surface of the upper frame part 301b, and a wall 301h is provided also on an edge portion on each of the positive and negative sides of the X-axis on the upper surface of the upper frame part 301b. Furthermore, a projection 301i projected upward is provided between each of the walls 301h and the opening 301g. The projection 301i is continuously formed along the periphery edge of the opening 301g. The height of the projection 301i is lower than that of the wall 301h. Four hooks 301j projected in the Z-axis direction are provided outside the wall 301h on the upper surface of the upper frame part 301b.

A step between the lower frame part 301a and the upper frame part 301b is closed by a wall part 301k. An upper surface of the wall part 301k is hollowed downward (in the negative direction of the Z-axis) so as to be lowered by one step. A hollow (groove) 301k1 extending in the X-axis direction is formed on a lower surface of the wall part 301k. The hollow 301k1 taken along a plane parallel to a Y-Z plane has a V-shaped cross section. The hollow 301k1 is formed over the whole length of the wall part 301k.

As shown in FIG. 11B, ten projecting pieces 301l projected downward from the inner side of a lower surface are provided on the lower surface of the holder 301. The outline of the lower surface of the holder 301 is the same as the outline of the inner frame 303a of the support member 303 shown in FIG. 10A. When the holder 301 is put on the inner frame 303a, the ten projecting pieces 301l of the holder 301 fit inside the inner frame 303a. Thereby, the holder 301 is positioned on the support member 303.

The screen 110 is put on the projection 301e of the lower frame part 301a, and is supported on the holder 301. At this time, an end of the screen 110 on the negative side of the Y-axis is brought to the lower side of the wall part 301k. The projection 301e is continuously formed along three sides of the screen 110 in a state where the screen 110 is placed on the projection 301e. In this state, the screen 110 is contained inside the five walls 301d, and a slight clearance exists between the outer circumference of the screen 110 and each of the walls 301d.

The screen 111 is put on the projection 301i of the upper frame part 301b, and is supported on the holder 301. At this time, an end of the screen 111 on the positive side of the Y-axis overlaps with the upper side of the wall part 301k. The projection 301i is continuously formed along three sides of the screen 111 in a state where the screen 111 is put on the projection 301i. In this state, the screen 111 is contained inside the five walls 301h, and a slight clearance exists between the outer circumference of the screen 111 and each of the walls 301h.

In this manner, after the screens 110, 111 are respectively placed on the lower frame part 301a and the upper frame part 301b, the shielding members 302a, 302b shown in FIG. 1 are respectively placed on the lower frame part 301a and the upper frame part 301b. At this time, the four hooks 301f provided on the lower frame part 301a are fitted into four holes of the shielding member 302a, and the four hooks 301j provided on the upper frame part 301b are fitted into four holes of the shielding member 302b. A heat-resistant member (heat-resistant packing) is interposed between the screens 110, 111 and the shielding members 302a, 302b.

Figure 12A:
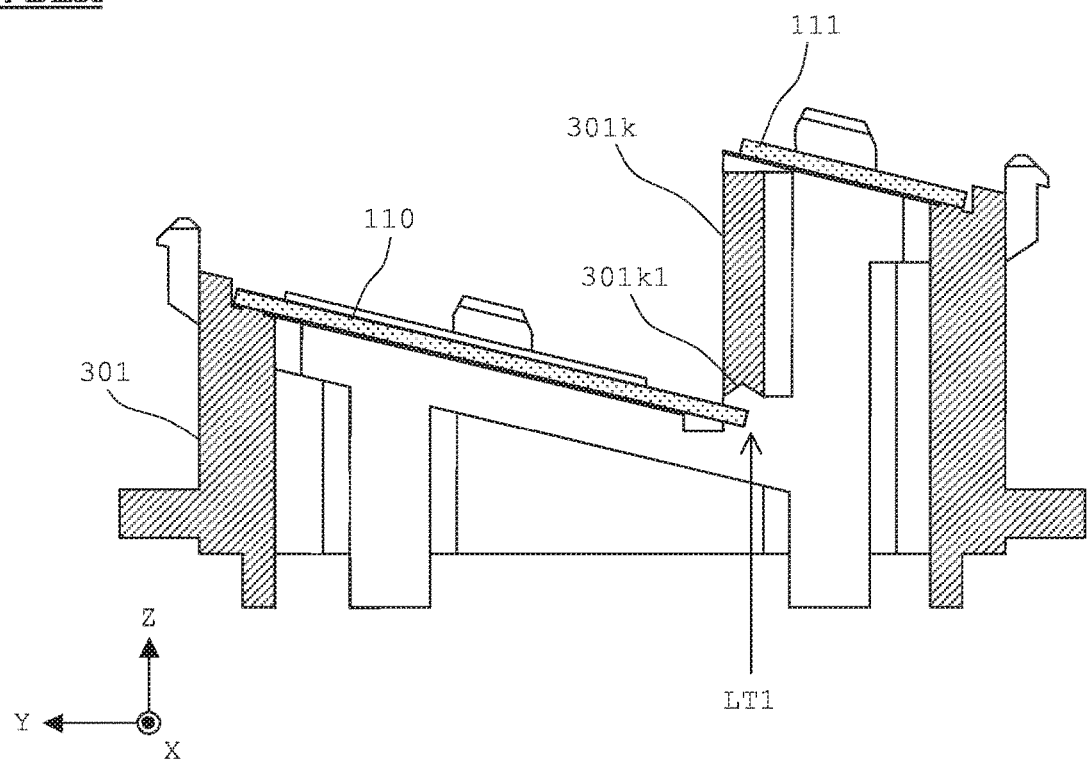
FIG. 12A is a cross-sectional view of the holder taken along a plane parallel to a Y-Z plane in a state where two screens are placed according to the embodiment 1.

FIG. 12A is a cross-sectional view of the holder 301 taken along a plane parallel to a Y-Z plane in a state where the screens 110, 111 are placed on the holder 301. In FIG. 12A, for convenience, the illustration of the shielding members 302a, 302b is omitted. As described above, when the output values of the laser light sources 101a and 101b are adjusted, laser light LT1 for adjusting an output value is emitted from the laser light sources 101a and 101b at the boundary position between the screens 110, 111 in the Y-axis direction. In this case, as shown in FIG. 12A, the wall part 301k is provided at the boundary position between the screens 110, 111 in the Y-axis direction, whereby the laser light LT1 for adjusting an output value is shielded by the wall part 301k. That is, the wall part 301k formed in the holder 301 serves as a light shield. This prevents the laser light for adjusting an output value from proceeding to the mirror 22 of FIG. 1C to serve as stray light.

According to the investigation by the present inventors, when the lower surface of the wall part 301k is designed to a flat plane, it is confirmed that a part of the laser light for adjusting an output value incident on the lower surface of the wall part 301k proceeds to the mirror 22, and the display image wholly looks slightly whitish during display.

Figure 12B:
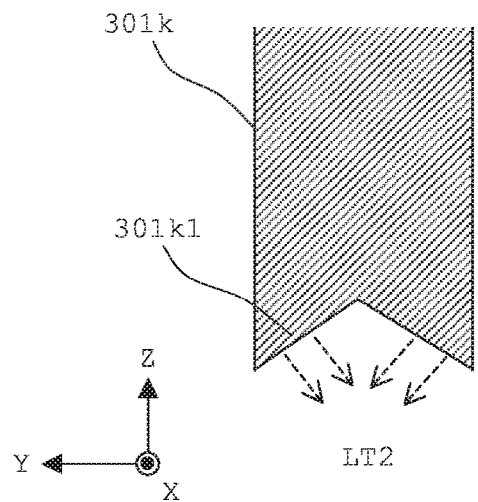
FIG. 12B is a cross-sectional view illustrating the shape and function of a hollow provided in a lower surface of a wall part according to the embodiment 1.
Figure 12B:
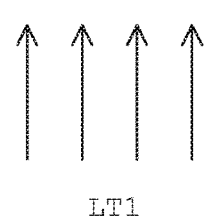

In order to eliminate such a problem, in the present embodiment, the hollow 301k1 is provided in the lower surface of the wall part 301k. Thereby, as shown in FIG. 12B, the laser light LT1 for adjusting an output value incident on the lower surface of the wall part 301k is captured into the hollow 301k1, and is returned to the correction lens 109 side as reflected light LT2. Thereby, the laser light LT1 for adjusting an output value can be more surely shielded. This more surely prevents a part of the laser light for adjusting an output value from proceeding to the mirror 22 to cause the display image to wholly look slightly whitish during display.

Figure 12C:
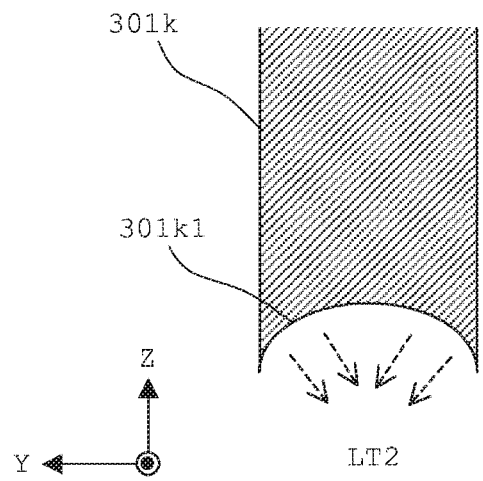
FIG. 12C is a cross-sectional view illustrating the shape and function of a hollow provided in a lower surface of a wall part according to modification example.
Figure 12C:
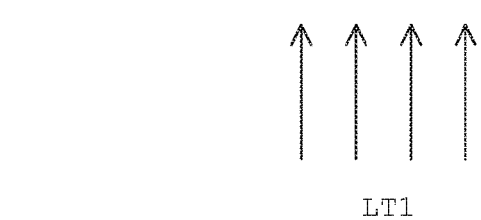

The hollow 301k1 may not necessarily have a V-shape. For example, the hollow 301k1 may have a U-shape as shown in FIG. 12C, or a rectangular recessed shape. The hollow 301k1 may have a shape capable of preventing a part of the laser light for adjusting an output value from proceeding to the mirror 22.

Effects of Embodiment 1

As described above, according to the present embodiment, the following effects are exhibited.

In the correction, each of the laser light sources 101a to 101c may be pulse-emitted twice, whereby the number of light emissions of the laser light sources 101a to 101c required for correcting the current value can be remarkably reduced. Therefore, the correction processing of the current value corresponding to the target light amount can be effectively shortened.

As shown in FIG. 7B, the image control circuit 201 changes the low output side setting value (current setting value I1) and the high output side setting value (current setting value I1) used for the correction in response to the luminance level (luminance setting value) of the image displayed via the screens 110, 111. In this manner, the accuracy of the corrected values (correction multiplier α, difference ΔIth) can be improved by performing the correction processing using the setting value suitable for each luminance level (luminance setting value). Therefore, the correction processing can be more appropriately performed.

As shown in FIG. 7B, the image control circuit 201 changes the low output side setting value (current setting value I1) and the high output side setting value (current setting value I1) used for the correction in response to the ambient temperature near the laser light sources 101a to 101c. In this manner, the accuracy of the corrected values (correction multiplier α, difference ΔIth) can be improved by performing the correction processing using the setting value suitable for the ambient temperature. Therefore, the correction processing can be more appropriately performed.

At the predetermined position in the range of the display angle for displaying the display image of one frame (in the present embodiment, in the boundary position between the screens 110, 111), the laser light for adjusting an output value is emitted, whereby it is not necessary to adjust the emission position of the laser light for adjusting an output value even if the image drawing region on the screen changes for the distortion correction of the display image. Therefore, the outputs of the laser light sources 101a to 101c can be smoothly adjusted irrespective of the distortion correction of the display image.

Here, the "display angle" is the swing angle of the laser light for displaying the image of one frame. That is, the laser light of each color may be swung in a two-dimensional direction in the movable range of the mirror 108a in the scanner 108 shown in FIG. 2. Meanwhile, the image of one frame is displayed in a swing angle range narrower than the movable range of the mirror 108a. That is, the laser light sources 101a to 101c are driven based on the video signal in a predetermined swing angle range narrower than the movable range of the mirror 108a, and the screens 110, 111 are scanned by the laser light of each color. In this manner, the swing angle of the laser light for displaying the image of one frame in the two-dimensional direction is referred to as the "display angle".

Figure 13:
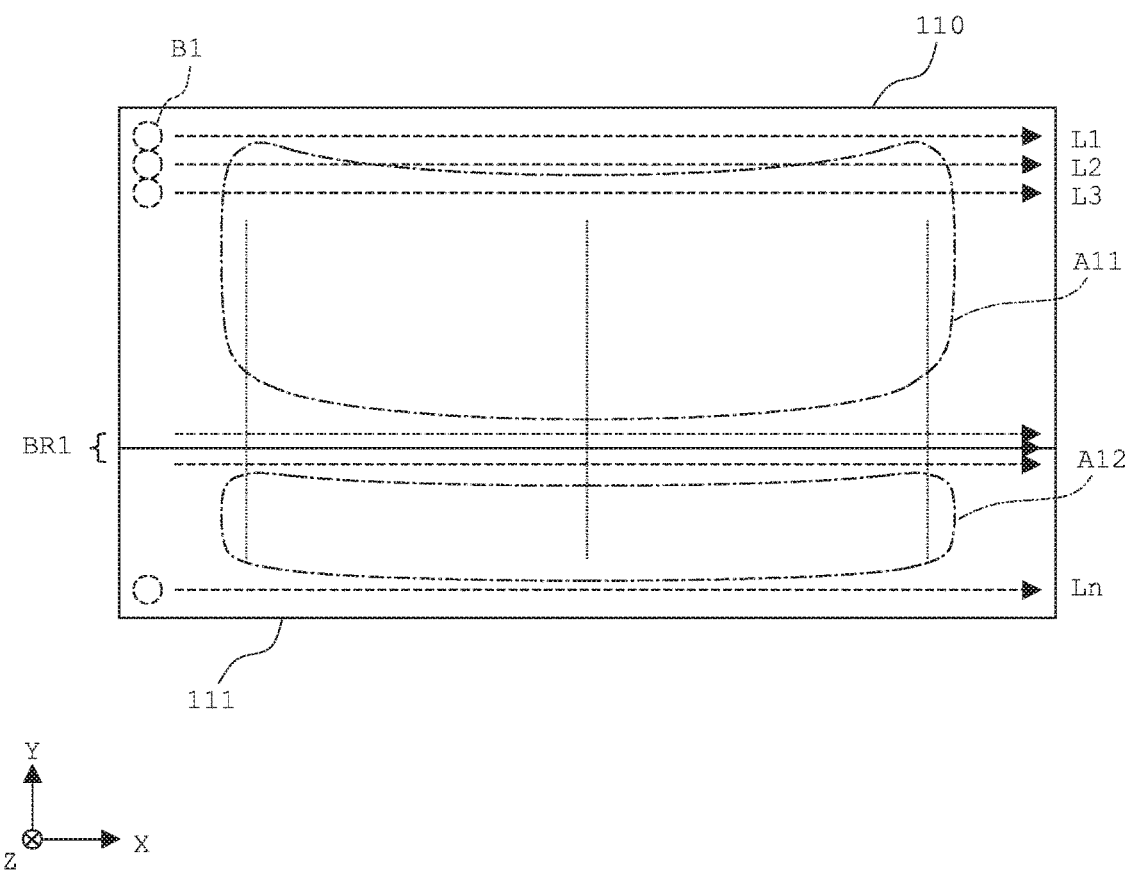
FIG. 13 is a diagram schematically exemplifying regions in which an image is drawn on two screens according to the embodiment 1.

In the present embodiment, in the range of the display angle, drawing is performed on the screen 110 and the screen 111. That is, two images are displayed on the screens 110, 111 in the range of the display angle. In the range of the display angle, a range in which the image is not drawn occurs between the two images. This range corresponds to the range of the boundary BR1 shown in FIG. 3B. FIG. 13 schematically shows regions A11 and A12 in which the image is drawn on the screens 110, 111.

In the present embodiment, in this manner, at the position in the boundary between the drawing ranges of the two images in the range of the display angle, i.e., in the boundary BR1 between the screens 110, 111, the laser light for adjusting an output value is emitted. For this reason, the output values of the laser light sources 101a to 101c can be adjusted by the laser light for adjusting an output value while two images having different visual distances are displayed by the screens 110, 111. The laser light for adjusting an output value is emitted in the range of the display angle, whereby the outputs of the laser light sources 101a to 101c can be smoothly adjusted irrespective of the distortion correction of the display image as described above.

In the present embodiment, as shown in FIG. 12A, the wall part 301k (light shield) is provided in the boundary between the two screens 110, 111, and the laser light for adjusting an output value is irradiated to the position of the wall part 301k (light shield). This can prevent the laser light LT1 for adjusting output value from being mixed with the display image, whereby the quality of the display image can be highly maintained.

As shown in FIGS. 12A and 12B, the hollow 301k1 is provided on the lower surface of the wall part 301k (light shield), whereby the laser light LT1 for adjusting output value can be more surely prevented from being mixed with the display image. Thereby, the quality of the display image can be more highly maintained.

In the present embodiment, the wall part 301k and the hollow 301k1 are integrally formed in the holder 301, whereby a member shielding the laser light for adjusting an output value may not be separately disposed. Therefore, the configuration of the image display device 20 can be simplified.

In the present embodiment, the hollow 301k1 is provided over the whole length of the wall part 301k, but the hollow 301k1 may be provided at least at a position to which the laser light for adjusting an output value is irradiated.

Embodiment 2

In the Embodiment 1, the pulse widths of the drive currents applied to the laser light sources 101a to 101c at each pixel position on the scan lines L1 to Ln are fixed at a given value. On the other hand, in an embodiment 2, the pulse widths of drive currents applied to laser light sources 101a to 101c are adjusted in response to an ambient temperature near a laser drive circuit 202.

According to the investigation by the present inventors, it is confirmed that, as an ambient temperature near an image display device 20 decreases, the shade of a display image changes. The cause is confirmed as follows. As the ambient temperature decreases, the pulse widths of light pulses output from the laser light sources 101a to 101c are gradually shortened by the circuit characteristic of a circuit part including the laser drive circuit 202.

Figure 14A:
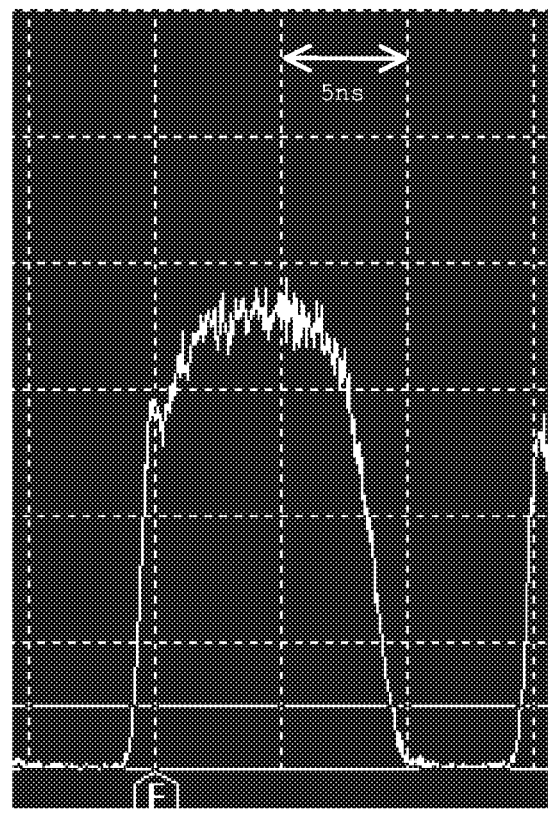
FIG. 14A is a diagram illustrating the measurement result of the optical waveform of laser light pulse-emitted from a laser light source according to the embodiment 2 when an ambient temperature is 25° C. and −25° C.
Figure 14B:
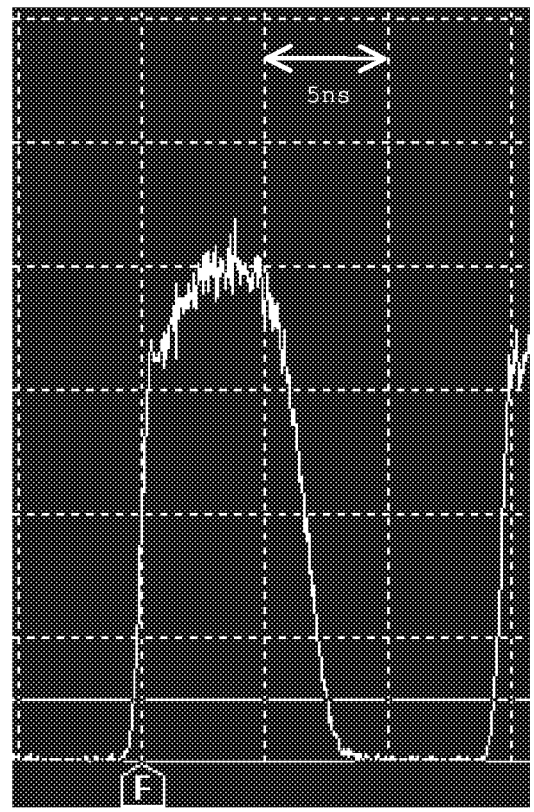
FIG. 14B is a diagram illustrating the measurement result of the optical waveform of laser light pulse-emitted from a laser light source according to the embodiment 2 when an ambient temperature is 25° C. and −25° C.

FIG. 14A shows a light pulse waveform at room temperature (25° C.), and FIG. 14B shows a light pulse waveform at a low temperature (−20° C.). The light pulse waveform is measured using an optical oscilloscope C8188 manufactured by Hamamatsu Photonics K.K. The reason why such a phenomenon occurs is considered to be that the electric input and light output characteristics of the laser light source change depending on the ambient temperature, and the followability of the characteristics to an input signal are improved at a low temperature. Furthermore, it becomes clear that the manner of characteristic change is changed for each of the laser light sources, whereby color temperature change as the image appears during white display.

Therefore, this problem can be solved by lengthening the pulse widths of the drive signals applied to the laser light sources 101a to 101c in response to the decrease of the ambient temperature near the circuit part including the laser drive circuit 202 to maintain the pulse width of the light pulse at its original width.

In this case, a look-up table causing the ambient temperature and the pulse width of the drive current to correspond to each other is further added to an image control circuit 201. Here, the ambient temperature described in the look-up table may not necessarily directly show the ambient temperature near the circuit part including the laser drive circuit 202. For example, the ambient temperature described in the look-up table may indirectly show the ambient temperature near the circuit part including the laser drive circuit 202 such as an ambient temperature and an outside air temperature detected by a temperature sensor 121 shown in FIG. 2.

When the drive current of the pulse width is applied to the laser light source at the corresponding ambient temperature, the pulse width of the drive current described in the look-up table is set so that the light pulse of the pulse width preliminarily set from the laser light source is output. That is, the pulse width of the drive current at each ambient temperature is set so that the light pulse is output with the same pulse width under any temperature environment.

The image control circuit 201 obtains an ambient temperature which should be referred in the look-up table from the corresponding temperature sensor. For example, when an ambient temperature described in the look-up table is a temperature detected by the temperature sensor 121 shown in FIG. 2, the image control circuit 201 obtains an ambient temperature using a detection signal from the temperature sensor 121, and obtains a pulse width corresponding to the obtained ambient temperature from the look-up table. The image control circuit 201 sets the pulse width of a drive current which should be applied to the laser light source at each pixel position to the pulse width obtained from the look-up table.

In this case, the look-up table may be set for each of the laser light sources 101a to 101c of respective colors. Thereby, when the variation of the pulse width with decreasing temperature is different for each of the laser light sources 101a to 101c, the pulse widths of the laser light sources 101a to 101c of respective colors can be more accurately maintained at a predetermined value.

Figure 15:
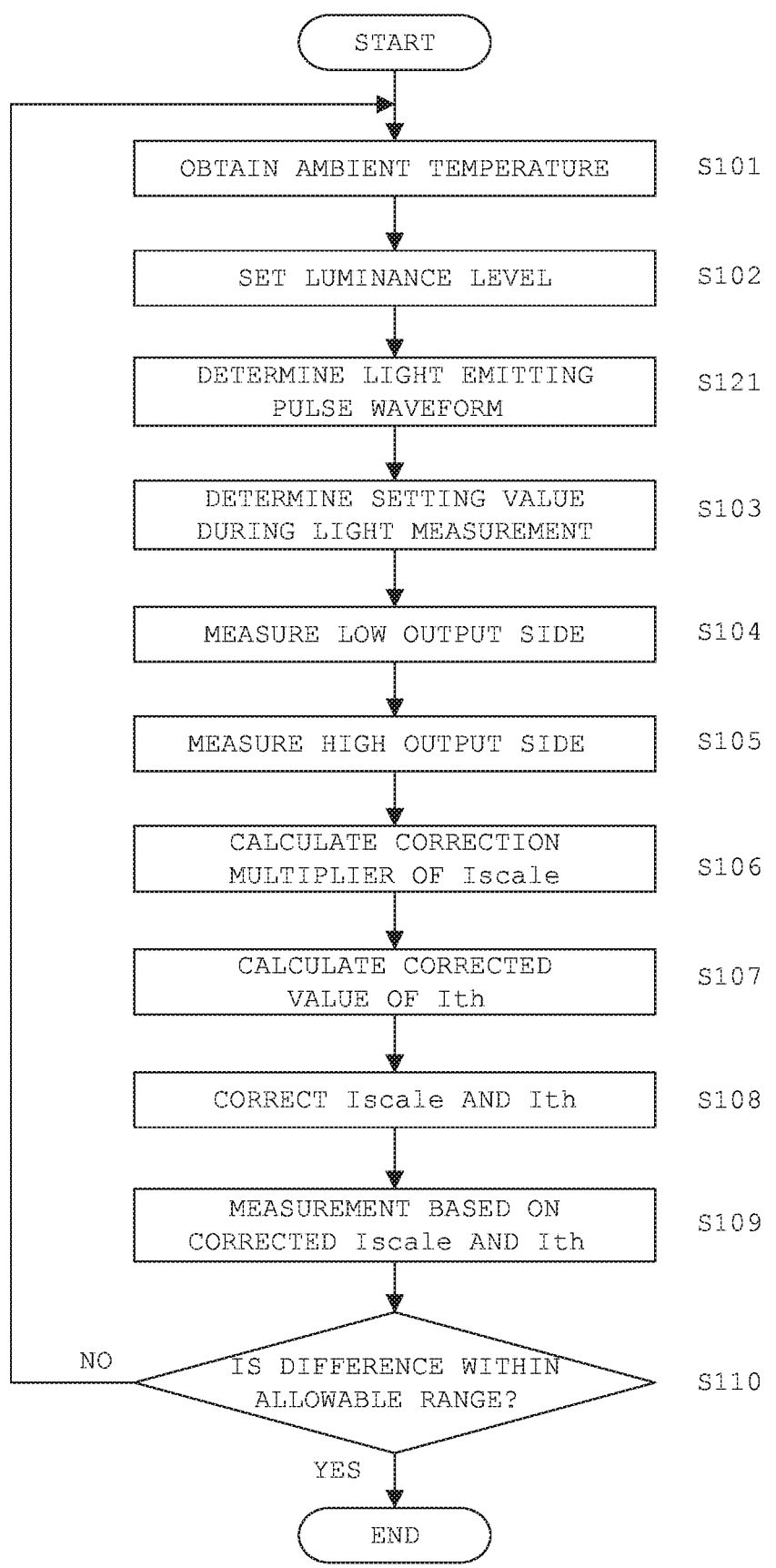
FIG. 15 is a flow chart illustrating the correction processing of the current value of the laser light source according to the embodiment 2.

The processing according to the present embodiment 2 may be included in a flow chart correcting a scale value (Iscale) and a threshold current value (Ith), for example, as shown in FIG. 15. Here, step S121 is added as the processing according to the embodiment 2. In step S121, the pulse width corresponding to the ambient temperature is obtained from the look-up table based on the ambient temperature obtained in step S101, and the pulse width of the drive current applied to the laser light source 101a at each pixel position is set to the obtained pulse width. In this case, the ambient temperature described in the look-up table is a temperature detected by the temperature sensor 121.

When the temperature detected by the temperature sensor 121 also in this case is between ambient temperatures described in the look-up table, a pulse width corresponding to an ambient temperature closest to the detected temperature is obtained. The other laser light sources 101b, 101c are also subjected to the same processing.

According to the embodiment 2, the pulse width of the laser light emitted at each pixel position from the laser light sources 101a to 101c can be maintained constant irrespective of the change of the ambient temperature. Therefore, the change of the shade of the display image due to temperature change can be suppressed, which allows a higher quality image to be displayed. According to the flow chart of FIG. 15, in a state where the pulse width of the laser light is maintained constant, the scale value (Iscale) and the threshold current value (Ith) are corrected, whereby the accuracy of the correction can be improved.

The processing which determines the pulse width of the drive current is included in the flow chart correcting the scale value (Iscale) and the threshold current value (Ith) in the example of FIG. 15, but the processing may be performed in parallel according to a flow chart other than the flow chart correcting the scale value (Iscale) and the threshold current value (Ith). In this case, in this flow chart, steps S101, S121 shown in FIG. 15 are performed in the same order as that of FIG. 15. The processing of the flow chart may be performed for each frame or every few frames. Alternatively, the processing of the flowchart may be performed in response to the ambient temperature changing by a predetermined value.

Two measurements are performed using two setting values, i.e., the low output side setting value and the high output side setting value when the scale value (Iscale) and the threshold current value (Ith) are corrected in the embodiment 1, but the number of measurements is not limited to 2.

As long as the guessed characteristic G1 can be obtained, the number of measurements may be the other number of measurements. However, as the number of measurements increases, the time required for the correction processing increases, whereby the number of measurements is preferably as small as possible. The smallest number of measurements which can obtain the guessed characteristic G1 is 2, whereby the number of measurements is most preferably 2 as shown in the embodiment 1 from the viewpoint of the speed-up of the correction processing.

The ambient temperatures of the three laser light sources 101a to 101c are detected by one temperature sensor 121 in the embodiment 1. The temperature sensors may be provided around the three laser light sources 101a to 101c to individually detect the ambient temperatures of the laser light sources 101a to 101c.

Modification Example

In the embodiments 1 and 2, the light output values of the three laser light sources 101a to 101c are detected by one light detector 107, but the light output values of the three laser light sources 101a to 101c may be detected by different light detectors 107. For example, the mirror 104 and the dichroic mirrors 105a, 105b may be configured so that the laser light from the laser light sources 101a to 101c transmits by a few percents, and the transmitting laser light of each color may be individually detected by the light detector.

In the embodiments 1 and 2, the scan line near the boundary BR1 between the screens 110, 111 is used for correcting the scale value (Iscale) and the threshold current value (Ith), but the scanning position subjected to the correction processing is not limited thereto. For example, in the fly-back period, the scale value (Iscale) and the threshold current value (Ith) may be subjected to correction processing.

The two screens 110, 111 may not be necessarily provided. For example, the image may be displayed on one screen. Furthermore, the screen may not necessarily move in the Z-axis direction, or may be fixed at a predetermined position. In this case, only an image having no parallax in the depth direction is displayed. Furthermore, the operation expressions are not necessarily limited to those shown in the embodiment 1, and may be other operation expressions as long as the operation expressions can suppress the difference between the reference characteristic and the guessed characteristic to correct the current value with respect to the target light amount.

In the embodiment 1, the two screens 110, 111 are disposed, but the number of the screens is not limited thereto, and only one screen may be disposed. In this case, two images may be drawn on one screen. The laser light for adjusting an output value may be emitted in the boundary between the two images, to adjust the outputs of the laser light sources 101a to 101c. The emission position of the laser light for adjusting an output value may be set in the range in which the image is not displayed in the display angle.

The method of adjusting the outputs of the laser light sources 101a to 101c using the configuration for shielding the laser light for adjusting an output value shown in FIGS. 9A to 12C is not necessarily limited to the methods described in the embodiments 1 and 2, and may be the other methods as long as the laser light for adjusting an output value is used.

In the embodiment 1, the laser light for adjusting an output value is shielded by the wall part 301k provided in the holder 301, but the configuration for shielding the laser light for adjusting an output value is not limited thereto. For example, a mask may be provided in the region through which the laser light for adjusting output value on the screens 110, 111 passes, to shield the laser light for adjusting output value. When the width of the lower surface of the wall part 301k is large such that the laser light for adjusting an output value can be substantially completely shielded, the hollow 301k1 may not be necessarily provided in the lower surface of the wall part 301k.

The screen may not necessarily move in the Z-axis direction, and may be fixed at a predetermined position. In this case, only an image having no parallax in the depth direction is displayed.

In the embodiment 1, the example in which the present invention is applied to the head-up display mounted on the vehicle 1 is showed, but the present invention is not limited to the image display device for on-vehicle use, and can be applied to the other type of image display device.

The configuration of the image display device 20 and the configuration of the irradiation light generator 21 are not limited to those described in FIGS. 1C and 2, and can be appropriately changed. Furthermore, the first lens parts 110a and the second lens parts 110b may be integrally formed in the screen 110. Alternatively, a transparent sheet including the lens parts may be pasted on the substrate of the screen 110.

The embodiments of the present invention can be modified in various ways as appropriate within the scope of the technical idea described in the claims.

What is claimed is:

1. An image display device comprising:
a light source emitting laser light;
a scanner causing the laser light to scan to draw an image;
a light detector detecting a light amount of the laser light emitted from the light source; and
a controller controlling the light source by changing a current value to drive the light source in response to a target light amount,
wherein the controller obtains a detection signal when driving the light source at a plurality of current setting values from the light detector, and corrects the current value with respect to the target light amount according to an arithmetic operation configured to suppress a difference between an output characteristic of the light source guessed by the obtained detection signal and a reference output characteristic, and
wherein the controller adds a value obtained by multiplying a value corresponding to the target light amount by a scale value to a current value of a light emitting threshold of the light source, to obtain the current value with respect to the target light amount, and obtains a corrected value of the current value of the light emitting threshold and a corrected value of the scale value according to the arithmetic operation configured to suppress the difference between the guessed output characteristic and the reference output characteristic.

2. The image display device according to claim 1, wherein the controller sets two current setting values, and performs the arithmetic operation.

3. The image display device according to claim 1, wherein the controller changes the current setting values in the arithmetic operation in response to a luminance setting value of the image to be displayed.

4. The image display device according to claim 1, further comprising a temperature detector detecting an ambient temperature near the light source, wherein the controller changes the current setting values in the arithmetic operation in response to the ambient temperature detected by the temperature detector.

5. The image display device according to claim 1, further comprising a temperature detector detecting an ambient temperature, wherein the controller changes a pulse width of a drive signal applied to the light source based on the ambient temperature detected by the temperature detector.

6. The image display device according to claim 1, wherein the controller causes the light source to emit laser light for adjusting an output value of the light source at a predetermined position in a range of a display angle configured to display a display image of one frame, and adjusts an output of the light source based on the detection signal of the light detector with respect to the laser light for adjusting the output value.

7. An image display device comprising:
a light source emitting laser light;
a screen on which an image is drawn by being two-dimensionally scanned by the laser light;
a scanner causing the laser light to scan the screen;
a light detector detecting a light amount of the laser light emitted from the light source; and
a controller,
wherein the controller causes the light source to emit the laser light for adjusting an output value of the light source at a predetermined position in a range of a display angle configured to display a display image of one frame, and adjusts an output of the light source based on a detection signal of the light detector with respect to the laser light for adjusting the output value, and
wherein an emission position of the laser light for adjusting the output value is in a boundary between a drawing range of a first image and a drawing range of a second image in the range of the display angle.

8. The image display device according to claim 7, further comprising a first screen and a second screen arranged in alignment with the first screen in a direction perpendicular to a traveling direction of the laser light,
wherein an emission position of the laser light for adjusting the output value is in a boundary between the first screen and the second screen.

9. The image display device according to claim 8, further comprising a light shield provided in the boundary between the first screen and the second screen,
wherein the laser light for adjusting the output value is irradiated to the position of the light shield.

10. The image display device according to claim 9, wherein the light shield includes a hollow formed at least at a position to which the laser light for adjusting the output value is irradiated.

11. The image display device according to claim 9, wherein:
the first screen and the second screen are held by a common holder; and
the light shield is a wall part provided in the holder.

12. The image display device according to claim 11, further comprising an actuator moving the holder in a direction parallel to the traveling direction of the laser light.

13. An image display device comprising:
a light source emitting laser light;
a screen on which an image is drawn by being two-dimensionally scanned by the laser light;
a scanner causing the laser light to scan the screen;
a light detector detecting a light amount of the laser light emitted from the light source; and a controller, wherein the controller causes the light source to emit the laser light for adjusting an output value of the light source at a predetermined position in a range of a display angle configured to display a display image of one frame, and adjusts an output of the light source based on a detection signal of the light detector with respect to the laser light for adjusting the output value, wherein the screen comprises a first screen and a second screen arranged in alignment with the first screen in a direction perpendicular to a traveling direction of the laser light, and wherein an emission position of the laser light for adjusting the output value is in a boundary between the first screen and the second screen.

* * * * *